United States Patent
Mori et al.

(10) Patent No.: US 11,446,780 B2
(45) Date of Patent: *Sep. 20, 2022

(54) DUST COLLECTOR

(71) Applicant: MAKITA CORPORATION, Anjo (JP)

(72) Inventors: Keita Mori, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 17/060,178

(22) Filed: Oct. 1, 2020

(65) Prior Publication Data
US 2021/0016405 A1    Jan. 21, 2021

Related U.S. Application Data

(62) Division of application No. 16/133,887, filed on Sep. 18, 2018, now Pat. No. 10,864,609.

(30) Foreign Application Priority Data

Sep. 28, 2017  (JP) .............................. JP2017-188746
Sep. 28, 2017  (JP) .............................. JP2017-188749

(51) Int. Cl.
*B23Q 11/00* (2006.01)
*B25D 16/00* (2006.01)
(Continued)

(52) U.S. Cl.
CPC ...... *B23Q 11/0046* (2013.01); *B23Q 11/0071* (2013.01); *B25D 16/006* (2013.01);
(Continued)

(58) Field of Classification Search
CPC ..... B23B 47/34; B23Q 11/0046; B25D 17/20; B25D 16/006
See application file for complete search history.

(56) References Cited

U.S. PATENT DOCUMENTS 5,129,467 A   7/1992  Watanabe et al.
5,467,835 A  11/1995  Obermeier et al.
(Continued)

FOREIGN PATENT DOCUMENTS

CN  102909711 A   2/2013
DE  40 30 067 A1  3/1992
(Continued)

OTHER PUBLICATIONS

Aug. 24, 2021 Office Action issued in Japanese Patent Application No. 2017-188746.
(Continued)

*Primary Examiner* — Nathaniel C Chukwurah
(74) *Attorney, Agent, or Firm* — Oliff PLC

(57) ABSTRACT

A dust collector includes a body configured to be removably attached to a lower side of a tool body of a drilling tool, a dust storing part to be disposed on a lower side of the body, a sliding part having a suction port and held by the body so as to be slidable in a front-rear direction, a dust transfer passage extending within the sliding part and connecting the suction port and an inlet of the dust storing part, and a tool connection passage disposed within an internal space of the body and configured to connect an outlet of the dust storing part and an inlet of the tool body of the drilling tool. The dust storing part includes the inlet, a filter, a dust storing space and the outlet. The filter is disposed forward of the inlet of the dust storing part.

12 Claims, 13 Drawing Sheets

(51) Int. Cl.
*B25D 17/20* (2006.01)
*B25D 17/04* (2006.01)

(52) U.S. Cl.
CPC ............ *B25D 17/20* (2013.01); *B25D 17/043* (2013.01); *B25D 2211/061* (2013.01); *B25D 2216/0084* (2013.01); *B25D 2217/0057* (2013.01); *B25D 2250/265* (2013.01)

(56) References Cited

U.S. PATENT DOCUMENTS

| | | | |
|---|---|---|---|
| 7,047,647 B1 | 5/2006 | Muller et al. | |
| 7,354,226 B2* | 4/2008 | Britz | B25F 5/008 |
| | | | 173/198 |
| 7,909,114 B2 | 3/2011 | Nishikawa et al. | |
| 8,342,782 B2 | 1/2013 | Nishikawa et al. | |
| 10,864,609 B2* | 12/2020 | Mori | B25D 17/20 |
| 2002/0141836 A1 | 10/2002 | Ege et al. | |
| 2005/0281627 A1 | 12/2005 | Britz | |
| 2009/0148246 A1 | 6/2009 | Nishikawa et al. | |
| 2010/0269647 A1 | 10/2010 | Baumann et al. | |
| 2012/0273243 A1 | 11/2012 | Tada et al. | |
| 2013/0031881 A1 | 2/2013 | Machida et al. | |
| 2017/0100809 A1* | 4/2017 | Furusawa | B25F 5/02 |

FOREIGN PATENT DOCUMENTS

| | | |
|---|---|---|
| EP | 1 872 916 A2 | 1/2008 |
| JP | H07-156136 A | 6/1995 |
| JP | 2006-102854 A | 4/2006 |
| JP | 2009/137971 A | 6/2009 |
| JP | 2012-236272 A | 12/2012 |
| JP | 2017-071022 A | 4/2017 |

OTHER PUBLICATIONS

Mar. 25, 2021 Office Action issued in Japanese Patent Application No. 2017-188749.
Apr. 21, 2021 Office Action issued in Chinese Patent Application No. 201811123265.5.
Mar. 2, 2021 Office Action issued in Japanese Patent Application No. 2017-188746.

* cited by examiner

DUST COLLECTOR

CROSS-REFERENCE TO RELATED APPLICATIONS

This is a Divisional of application Ser. No. 16/133,887 filed Sep. 18, 2018, which claims the benefit of Japanese Patent Application No. 2017-188746 filed on Sep. 28, 2017 and Japanese patent application No. 2017-188749 filed on Sep. 28, 2017. The contents of the foregoing applications are incorporated fully herein by reference.

TECHNICAL FIELD

The present invention relates to a dust collector that is configured to be removably attached to a drilling tool and to collect dust generated during a drilling operation.

BACKGROUND ART

A dust collector is known which is attached to a drilling tool capable of performing a drilling operation, such as an electric drill and a hammer drill, and sucks dust generated during the drilling operation. For example, Japanese laid-open patent publication No. 2017-71022 discloses a dust collector which is configured to suck dust together with air through a suction port, using an air flow generated by a dust-collecting fan of a hammer drill, and transfer the dust to a dust storing part by way of a hose.

This hammer drill includes: an elongate tool body (body housing) extending in a front-rear direction; and a grip part protruding downward from one end portion of the tool body. The hammer drill is thus L-shaped (pistol-type) as a whole. A body of the dust collector is attached to a lower part of the tool body and disposed in a space in front of the grip part and below the tool body. In this dust collector, an inlet is disposed in a relatively front part of the dust storing part. The air flow flows into the dust storing part through the inlet, together with the dust, and passes through a filter disposed rearward of the inlet. The air flow from which the dust has been separated flows into the tool body through a passage. The passage extends in the up-down direction above the filter.

SUMMARY

In a pistol-type drilling tool such as the above-described hammer drill, it is desired to shorten the length of the tool body in the front-rear direction, in order to improve operability. Accordingly, it is also desired to shorten the length of the dust collector which is used while being attached to the drilling tool.

Accordingly, it is an object of the present invention to provide a technique that may contribute to reduce the size of a dust collector which is configured to be removably attached to a drilling tool.

In one aspect of the present invention, a dust collector is provided which is configured to be removably attached to a drilling tool, wherein the drilling tool includes a tool body having an inlet in a lower end portion of the tool body and a grip part protruding downward from the tool body. The dust collector is configured to collect dust by using an air flow generated by the drilling tool and led into the tool body from the inlet. The dust collector includes a body, a dust storing part, a sliding part, a dust transfer passage and a tool connection passage.

The body is configured to be removably attached to a lower side of the tool body. The body is formed as a hollow body having an internal space and an opening. The internal space extends in a front-rear direction and the opening is open forward. The internal space and an outside of the body are communicated with each other through the opening. The dust storing part is configured to be disposed aced on a lower side of the body when the body is attached to the tool body of the drilling tool. The dust storing part includes an inlet, a filter, a dust storing space and an outlet. The dust flows into the dust storing part together with the air flow through the inlet. The filter is configured to separate the dust from the air flow. The separated dust is stored in the dust storing space. The air flow from which the dust has been separated flows out of the dust storing part through the outlet. The sliding part has a suction port for the dust. The sliding part is held by the body so as to be slidable in the front-rear direction within the internal space in a state in which the suction port protrudes forward from the body through the opening. The dust transfer passage extends within the sliding part and connects the suction port of the sliding part and the inlet of the dust storing part. The tool connection passage is disposed within the internal space of the body. The tool connection passage is configured to connect the outlet of the dust storing part and the inlet of the tool body when the body is attached to the tool body. Further, the filter is disposed forward of the inlet.

The dust collector of the present aspect may be attached to the lower side of the tool body of the pistol-type drilling tool. For this reason, a space for placing a user's hand needs to be secured between the dust collector and the grip part in the front-rear direction. Further, in the dust collector of the present aspect, the dust transfer passage extends within the sliding part, which is slidable in the front-rear direction within the internal space of the body, and connects the suction port of the sliding part and the inlet of the storing part. With the dust collector having such a structure, a drilling operation is performed in a state in which the suction port of the sliding part surrounds the tool accessory attached to the drilling tool and the suction port is pressed against a workpiece. As the drilling operation proceeds and the tool accessory digs into the workpiece (that is, as the drilled hole is deepened), the sliding part is pushed rearward in the internal space. The length of the tool accessory to be used in the drilling tool is fixed to some extent, and accordingly, shortening of the length of the sliding part in the front-rear direction may be limited. Therefore, shortening of the length of the body which holds the sliding part so as to be slidable in the front-rear direction may be limited as well.

In a conventional dust collector, generally, an inlet through which air is led in together with dust is provided in a relatively front part of a dust storing part, and a filter is disposed rearward of the inlet. Therefore, a portion of the dust storing part which exists rearward of the inlet tends to be relatively large. On the contrary, in the present aspect, the filter is disposed on the front side of the inlet, so that the portion of the dust storing part which exists on the rear side of the inlet can be made as compact as possible. Thus, a space required between the dust collector and the grip part can be secured. Further, even when the body is shortened to the maximum possible extent in the front-rear direction within the above-described limit, a certain length is secured for the body on the front side of the inlet, in order to hold the sliding part. Accordingly, the dust storing part can secure a space for the filter on the front side of the inlet which space has about the same length as the body. Thus, the length of the whole dust collector in the front-rear direction can be rationally shortened by arranging the filter forward of the inlet.

In the present aspect, the drilling tool generally refers to a power tool which is capable of drilling a workpiece by rotationally driving a tool accessory. Examples of the drilling tool may include an electric drill, a vibration drill and a hammer drill.

The structure for removably attaching the body of the dust collector to the tool body is not particularly limited, but, for example, a combination of a guide rail and a guide groove, a combination of a hook and an engagement hole, or a combination of a projection and a fitting hole can be suitably used.

The structure of the dust storing part is not particularly limited, but, the dust storing space may be defined, for example, by a box-like container. The dust storing part may be fixedly or removably mounted to the body.

The structure of the sliding part is not particularly limited, but, it may be preferred that a portion of the sliding part which is held by the body so as to be slidable in the front-rear direction is configured to linearly extend in the front-rear direction. The dust transfer passage which extends within the sliding part may be wholly defined by a cylindrical member (such as a hose) other than the sliding part, or it may be defined partly by a cylindrical part of the sliding part and partly by the other cylindrical member.

The tool connection passage which is disposed within the internal space of the body may be defined, for example, by one or more cylindrical members. The tool connection passage in the internal space may extend in the up-down direction, or may extend obliquely with respect to the up-down direction, or may be at least partly curved. In order to realize reduction in size of the body, it may be preferred that the tool connection passage extends in the up-down direction (in other words, the tool connection passage connects the outlet and the inlet at the shortest distance).

In one aspect of the present invention, the dust collector is provided which is configured to be removably attached to a drilling tool, wherein the drilling tool includes a tool body having an inlet in a lower end portion of the tool body and a grip part protruding downward from the tool body. The dust collector is configured to collect dust generated during a drilling operation by using an air flow generated by the drilling tool and led into the tool body from the inlet. The dust collector includes a body, a dust storing part, a sliding part, a dust transfer passage and a tool connection passage.

The body is configured to be removably attached to a lower side of the tool body. The body is formed as a hollow body having an internal space and an opening. The internal space extends in a front-rear direction and the opening is open forward. The internal space and the outside of the body are communicated each other through the opening. The dust storing part is configured to be disposed on a lower side of the body when the body is attached to the tool body of the drilling tool. The dust storing part includes an inlet, a filter, a dust storing space and an outlet. The dust flows into the dust storing part together with the air flow through the inlet. The filter is configured to separate the dust from the air flow. The separated dust is stored in the dust storing space. The air flow from which the dust has been separated flows out of the dust storing part through the outlet. The sliding part has a suction port for the dust. The sliding part is held by the body so as to be slidable in the front-rear direction within the internal space in a state in which the suction port protrudes forward from the body through the opening. The dust transfer passage extends within the sliding part and connects the suction port of the sliding part and the inlet of the dust storing part. The tool connection passage is disposed within the internal space of the body, The tool connection passage is configured to connect the outlet of the dust storing part and the inlet of the tool body when the body is attached to the tool body. Further, the tool connection passage is disposed within a rear end portion of the body, and the filter is disposed forward of the outlet.

In a conventional dust collector, generally, a tool connection passage for connecting an outlet of a dust storing part and an inlet of a tool body is disposed above a filter. Accordingly, a body and a storing part of the dust collector need to have a portion protruding rearward of the outlet to a certain extent. On the contrary, in the present embodiment, the tool connection passage is arranged within the rear end portion of the body. Further, the filter is disposed on the front side of the outlet. Therefore, portions of the body and the storing part which exist on the rear side of the outlet can be made as compact as possible, so that a space required between the dust collector and the grip part can be secured. Further, even when the body is shortened to the maximum possible extent in the front-rear direction within the above-described limit, a certain length is secured for the body on front side of the tool connection passage (the outlet), in order to hold the sliding part. Accordingly, the dust storing part can secure a space for the filter on the front side of the outlet which space has about the same length as the body. Thus, the length of the whole dust collector in the front-rear direction can be rationally shortened by disposing the filter forward of the outlet.

In one aspect of the present invention, the outlet may be disposed rearward of the inlet. The tool connection passage which connects the outlet and the inlet of the tool body is disposed within the internal space of the body. Further, the dust transfer passage extending within the sliding part is connected to the inlet. Thus, by arranging the outlet on the rear side of the inlet, efficient arrangement can be realized while avoiding interference between the tool connection passage and the dust transfer passage.

In one aspect of the present invention, the dust storing part may include an inflow passage and a communication passage. The inflow passage may connect the inlet of the storing part and the dust storing space. The communication passage may communicate with the dust storing space via the filter and is connected to the outlet. The air flow from which the dust has been separated by the filter may be allowed to pass through the communication passage. The communication passage may be disposed to overlap with the inflow passage in a left-right direction. In other words, when viewed from the right or left, the communication passage overlaps with the inflow passage. It can also be said that a straight line extending in the left-right direction and passing the inflow passage also passes the communication passage. According to the present aspect, the air flow, which has passed through the filter disposed forward of the inlet, can pass the left or right side of the inflow passage within the communication passage and can be led to the outlet on the rear side of the inlet.

In one aspect of the present invention, the dust storing part may include a container body, a filter holder and a cover. The container body may be formed as a hollow body having an opening which is open upward, and has the dust storing space. The filter holder may be mounted on an upper end portion of the container body so as to close the opening of the container body and may hold the filter within the container body. The cover may be mounted on an upper end portion of the filter holder so as to cover the filter holder from above in a sealing manner. The communication passage may be formed between the filter holder and the cover in an up-down direction. As a method of mounting the cover on the filter holder in a sealing manner, a method in which a sealing member is arranged between the cover and the filter holder and a method in which the cover is directly held in close contact with the filter holder can be suitably used. According to the present aspect, with a simple structure, the communication passage can be formed on the upper side of the dust storing space (that is, between the dust storing space and the body in the up-down direction) while leakage of the air from a gap between the cover and the filter holder is prevented.

In one aspect of the present invention, the filter may be mounted to the filter holder in a sealing manner. As a method of mounting the filter to the filter holder in a sealing manner, a method in which a sealing member is arranged between the filter and the filter holder and a method in which the filter is directly held in close contact with the filter holder can be suitably used. According to the present aspect, the air from which dust is not yet separated can be prevented from passing through between the filter and the filter holder and entering the communication passage.

In one aspect of the present invention, the dust storing space may include a space below the outlet. A user may perform the drilling operation with the tool accessory pointed upward, in other words, with the suction port side or front side of the dust collector facing upward. In such a case, the dust separated by the filter may move to a rear region of the dust storing part by gravity and gather therein. The space below the outlet is located rearward of the filter, so that clogging of the filter can be suppressed by gathering dust in this space.

In one aspect of the present invention, a hammer drill is provided which is configured to perform a hammering operation of linearly driving a tool accessory along a driving axis and a drilling operation of rotationally driving the tool accessory around the driving axis. The hammer drill may include a tool body, a fan and the dust collector. The tool body may have an inlet in a lower end portion. The fan may be disposed within the tool body and configured to generate an air flow which flows into the tool body from the inlet. Any one of the dust collectors according to the above-described aspects can be employed as the dust collector. With such a hammer drill, the air flow for sucking the dust is generated by the fan of the hammer drill, so that the dust collector is not required to have a mechanism for generating such air flow. Therefore, increase in size of the dust collector can be prevented. Further, the above-described effect to be realized by the dust collector can be obtained.

In one aspect of the present invention, the hammer drill may further include a motor and a covering member. The motor includes a motor body and a motor shaft. The motor body includes a stator and a rotor. The motor shaft extends parallel to the driving axis and has the fan mounted on the motor shaft. The covering member is configured to open and close the inlet of the tool body. The tool body may include a mounting part to which and from which the dust collector is attachable and detachable in parallel to the driving axis. The covering member may be configured to be held in a close position in which the covering member closes the inlet when the dust collector is not attached to the mounting part. Further, the covering member may be configured to be moved to an open position in interlock with attaching of the dust collector to the mounting part.

In the hammer drill of the present aspect, the dust collector can be attached to and detached from the mounting part of the tool body, in parallel to the driving axis. The tool accessory may be attached to the hammer drill such that the axis of the tool accessory coincides with the driving axis. Thus, the axial direction of the tool accessory is parallel to the direction of attaching and detaching the dust collector. Therefore, the dust collector can be attached and detached while the suction port is properly placed to surround the tool accessory, even with the tool accessory attached to the hammer drill. Further, the covering member can automatically open and close the inlet of the tool body, in interlock with attaching and detaching of the dust collector. When the dust collector is not attached, the covering member can close the inlet and prevent foreign materials such as dust from entering the tool body. Further, in the hammer drill of the present aspect, the motor is disposed such that the motor shaft extends in parallel to the driving axis. Therefore, compared with a structure in which the motor shaft extends in a direction crossing the driving axis, the tool body can be formed compact.

DETAILED DESCRIPTION OF THE EMBODIMENTS

An embodiment of the present invention is now described with reference to the drawings. In the following embodiment, a hand-held hammer drill is described as an embodiment of a power tool which is configured to perform a processing operation by driving a tool accessory. Further, a dust collector which is configured to be removably attached to the hammer drill is also described.

Figure 1:
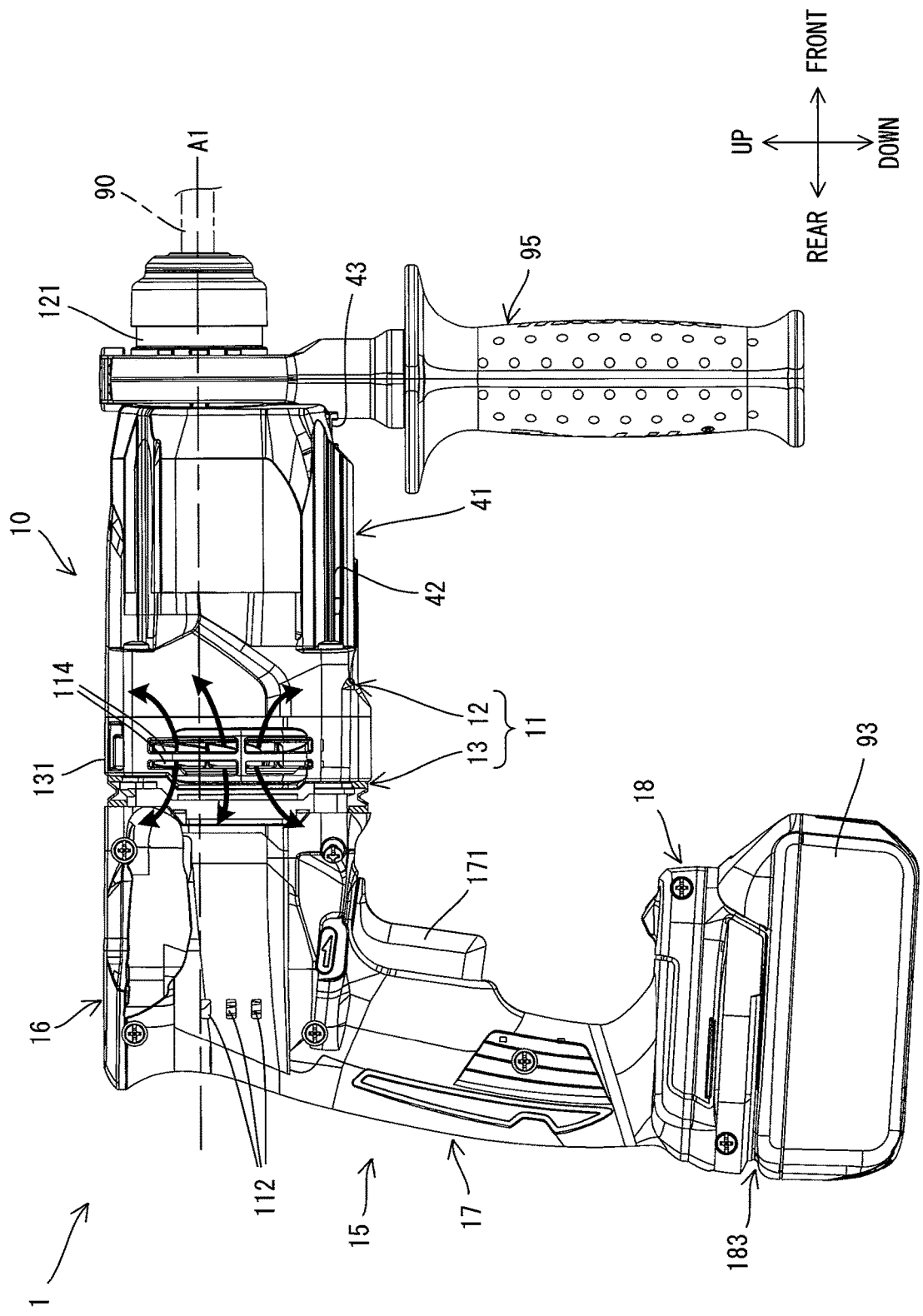
FIG. 1 is a right side view of a hammer drill.

First, the general structure of the hammer drill 1 is briefly described with reference to FIG. 1. As shown in FIG. 1, the hammer drill 1 has a body 10 and a grip part 17.

The body 10 has an elongate shape extending along a prescribed driving axis A1. A tool accessory 90 may be removably attached to one end portion of the body 10 in its longitudinal direction via a tool holder 30 (see FIG. 3). This one end portion of the body 10 has a cylindrical shape, and an auxiliary handle 95 formed separately from the hammer drill 1 may be removably attached onto an outer periphery of this end portion. The grip part 17 extends from the other end portion of the body 10 in a direction crossing (more specifically, generally perpendicular to) the driving axis A1. The grip part 17 is configured to be held by a user.

The hammer drill 1 of the present embodiment is configured to perform an operation (a hammering operation) of linearly driving the tool accessory 90 along the driving axis A1, and an operation (a drilling operation) of rotationally driving the tool accessory 90 around the driving axis A1. A user may select the tool accessory 90 of an appropriate kind and length according to an operation to be actually performed and attach the tool accessory 90 to the hammer drill 1 for use. The tool accessory 90 may be coupled to the tool holder 30 in such a manner that an axis of the tool accessory 90 coincides with the driving axis A1.

The structure of the hammer drill 1 is now described in detail. In the following description, for convenience sake, an extending direction of the driving axis A1 (also referred to as a longitudinal direction of the body 10 or an axial direction of the tool accessory 90) is defined as a front-rear direction of the hammer drill 1. One side to which the tool accessory 90 is coupled (or the side on which the tool holder 30 is disposed) is defined as a front side of the hammer drill 1, and the other side having the grip part 17 is defined as a rear side of the hammer drill 1. Further, a direction which is perpendicular to the driving axis A1 and corresponds to the extending direction of the grip part 17 is defined as an up-down direction. The body 10 side is defined as an upper side and a protruding end (free end) side of the grip part 17 is defined as a lower side. Furthermore, a direction which is perpendicular to the front-rear direction and the up-down direction is defined as a left-right direction.

Figure 2:
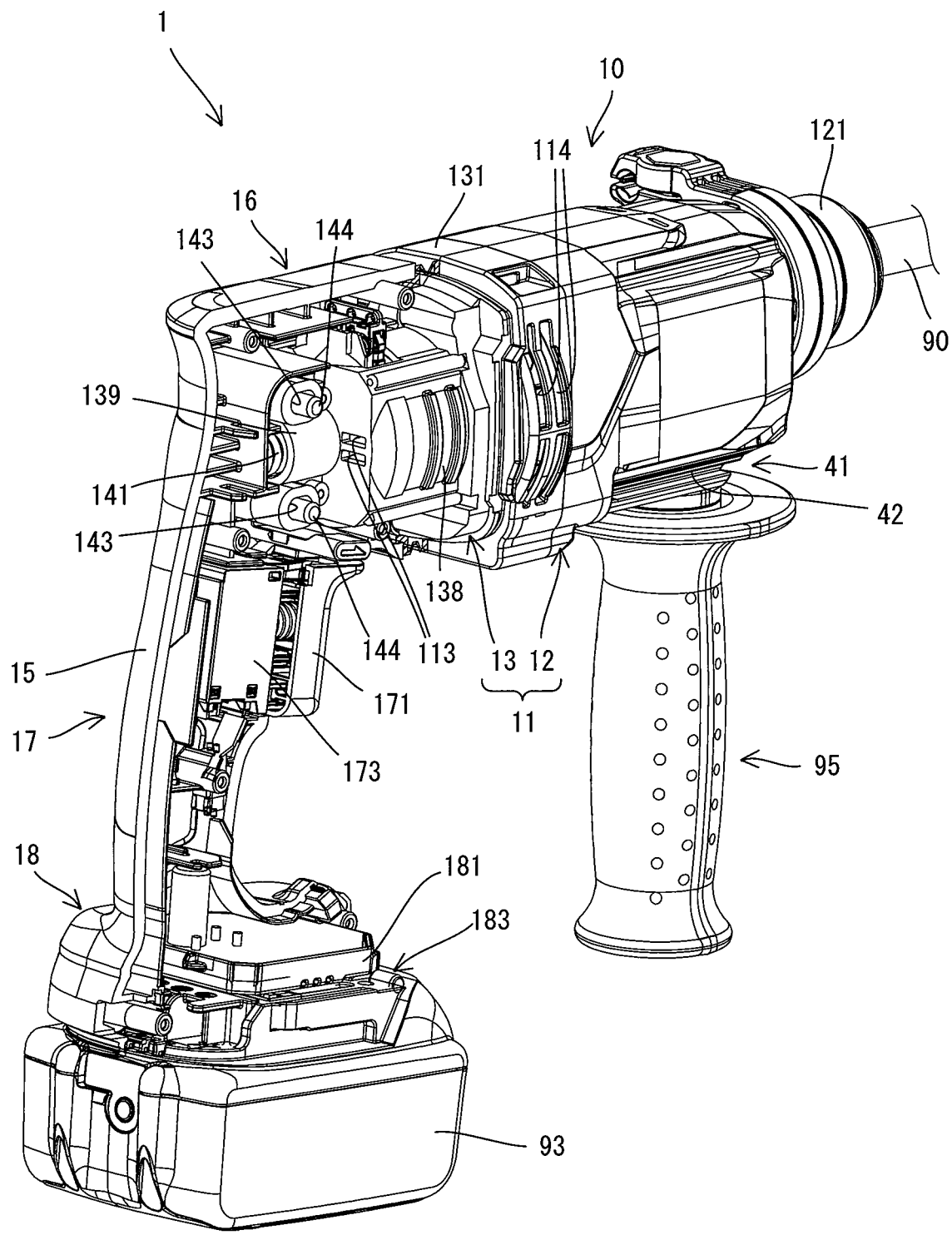
FIG. 2 is a perspective view showing the hammer drill in a state that part of a handle housing is removed.
Figure 3:
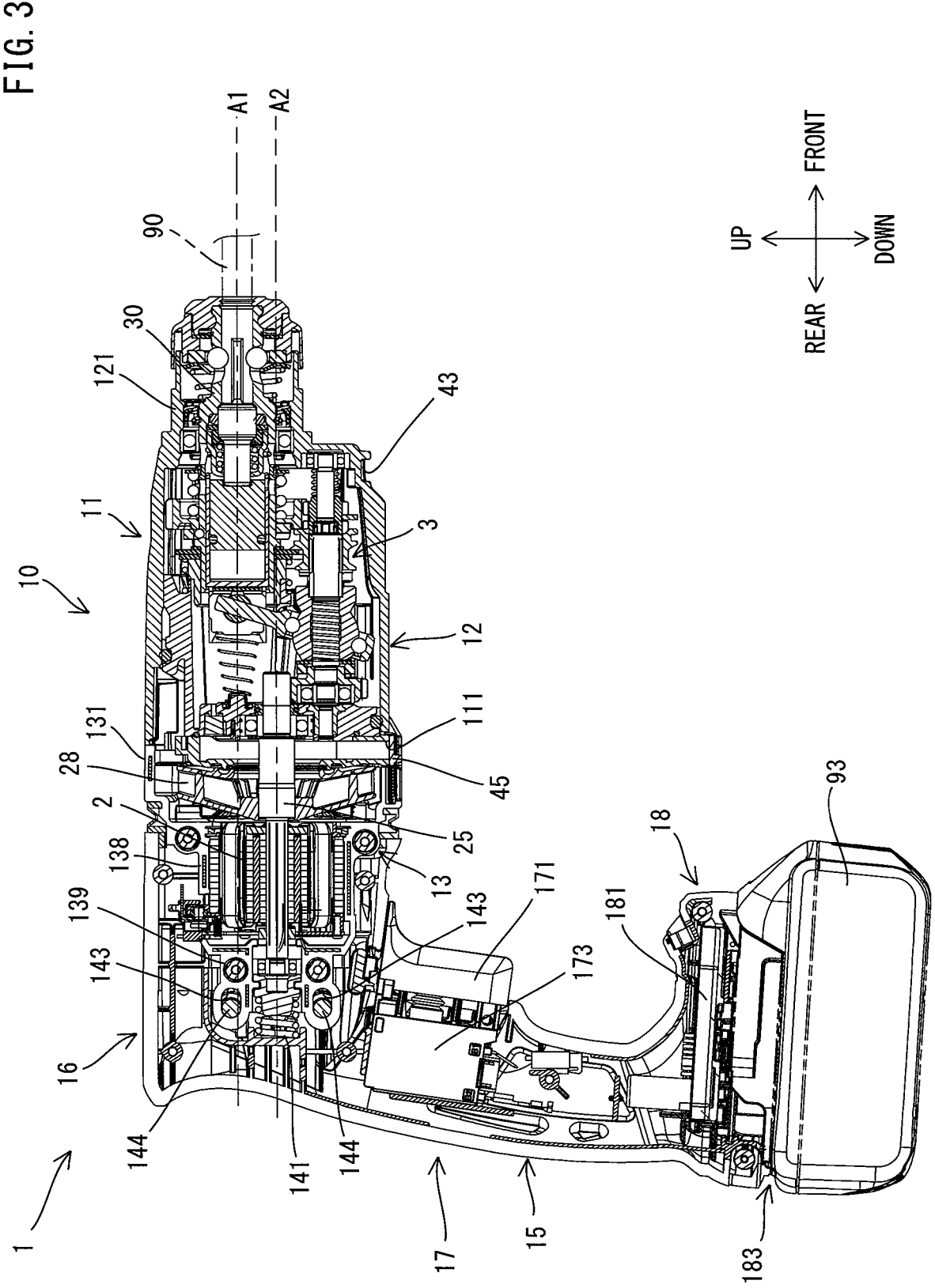
FIG. 3 is a longitudinal sectional view of the hammer drill.

First, the housing structure of the hammer drill 1 is described. As shown in FIGS. 1 to 3, the hammer drill 1 includes a body housing 11 and a handle housing 15.

As shown in FIG. 3, in the present embodiment, the body housing 11 includes a gear housing 12 and a motor housing 13, and is formed in an elongate form extending along the prescribed driving axis A1 as a whole.

The gear housing 12 as a whole is formed as an elongate cylindrical body extending in the front-rear direction along the driving axis A1. In the present embodiment, the gear housing 12 has a circular cylindrical barrel 121 in its front end portion, and a rear portion of the barrel 121 has a rectangular section as a whole. The motor housing 13 as a whole is formed as an elongate cylindrical body extending in the front-rear direction. A front end part 131 is connected to the gear housing 12. The front end part 131 has a generally rectangular section, corresponding to the gear housing 12. The remaining portion of the motor housing 13 which extends rearward from the front end part 131 has a smaller diameter than the front end part 131. The motor housing 13 having its internal mechanisms mounted therein is disposed on the rear side of the gear housing 12 having its internal mechanisms mounted therein, and the gear housing 12 and the motor housing 13 are fixedly connected together in the front-rear direction with screws (not shown). The gear housing 12 and the motor housing 13 are thus fixedly connected so as to be immovable relative to each other, so that the body housing 11 is formed as a single housing.

The body housing 11 has a structure for removably receiving a dust collector 5 (see FIG. 10) to be described later. Further, the body housing 11 has a structure for opening and closing a first inlet 111 in interlock with attaching and detaching of the dust collector 5. The first inlet 111 is an opening which communicates with a tool connection passage 87 in the dust collector 5. These structures and the internal configuration of the body housing 11 will be described later in detail.

As shown in FIGS. 2 and 3, the handle housing 15 as a whole is formed as an elongate cylindrical body extending generally in the up-down direction. More specifically, the handle housing 15 includes a covering part 16, the grip part 17 and a controller housing part 18.

The covering part 16 has a bottomed cylindrical shape having an open front end, and is disposed to cover most of the motor housing 13. The grip part 17 has an elongate cylindrical shape and protrudes downward from the rear end portion of the covering part 16. A trigger 171 is disposed on a front side of an upper end portion of the grip part 17. The trigger 171 is configured to be pulled (depressed) by a user. A switch 173 is disposed within the grip part 17. The switch 173 is configured to be normally held in an off-state and to be turned on in response to a pulling operation of the trigger 171. The controller housing part 18 is connected to a lower end portion of the grip part 17 and forms a lower end portion of the handle housing 15. The controller housing part 18 as a whole has a rectangular box-like shape, and houses a controller 181 for controlling driving of the motor 2. The controller 181 is configured to drive the motor 2 when the switch 173 is turned on. Further, a battery mounting part 183 is provided on a lower end portion of the controller housing part 18. The battery mounting part 183 is configured such that a battery 93 as a power source is removably attached thereto.

With such a structure, in the present embodiment, the body housing 11 and the covering part 16 of the handle housing 15 form the body 10 extending along the driving axis A1. Further, the gear housing 12, the front end part 131 of the motor housing 13 and the handle housing 15 are exposed to the outside and form an outer shell of the hammer drill 1. In the present embodiment, the handle housing 15 is elastically connected to the body housing 11 via an elastic member 141 (specifically, compression coil spring), so as to be movable in the front-rear direction relative to the body housing 11. The elastic member 141 is disposed between the covering part 16 and a rear end portion of the motor shaft 25. Further, a slot 143 and a guide pin 144 guide a relative movement of the handle housing 15 and the body housing 11. The slot 143 is an elongate hole which is longer in the front-rear direction and which is formed in a rear end portion of the body housing 11 (the motor housing 13). The guide pin 144 protrudes from the handle housing 15 in the left-right direction and inserted through the slot 143. With such a structure, a backlash (looseness) of the motor shaft 25 and transmission of vibration from the body housing 11 to the handle housing 15 can be reduced or prevented.

The internal configuration of the body housing 11 (the gear housing 12 and the motor housing 13) is now described.

Figure 4:
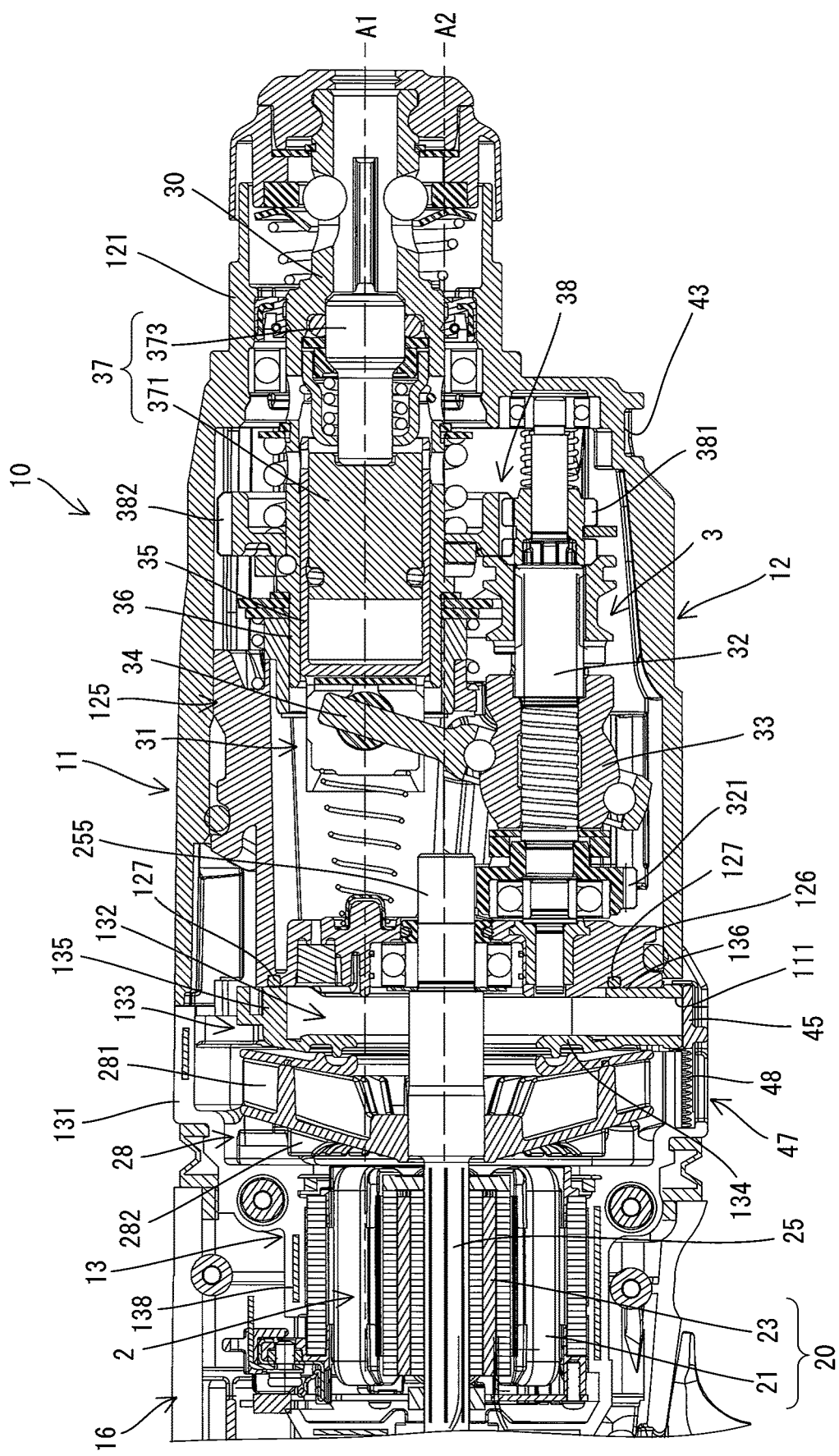
FIG. 4 is a partly enlarged view of FIG. 3, showing an internal structure of a body.

As shown in FIG. 4, the gear housing 12 houses the tool holder 30 and a driving mechanism 3. The tool holder 30 is disposed within the barrel 121. The tool holder 30 is configured to hold the tool accessory 90 such that the tool accessory 90 can move in the front-rear direction (the direction of the driving axis A1) and cannot rotate around the driving axis A1. In the present embodiment, the driving mechanism 3 includes a motion converting mechanism 31, a striking mechanism 37 and a rotation transmitting mechanism 38. Further, in the present embodiment, the driving mechanism 3 is supported by a metal support 125 and fixedly held within the gear housing 12.

The motion converting mechanism 31 is configured to convert rotation of the motor 2 into linear motion and to transmit it to the striking mechanism 37. As shown in FIG. 4, in the present embodiment, the motion converting mechanism 31 includes an intermediate shaft 32, a rotary body 33, a swinging member 34 and a piston cylinder 35. The intermediate shaft 32 extends in the front-rear direction in parallel to a motor shaft 25 to be described below. The rotary body 33 is provided on an outer periphery of the intermediate shaft 32. The swinging member 34 is provided on an outer periphery of the rotary body 33 and caused to swing in the front-rear direction along with rotation of the rotary body 33. The piston cylinder 35 has a bottomed circular cylindrical shape, and held within a circular cylinder 36 so as to be movable in the front-rear direction. The piston cylinder 35 is reciprocated in the front-rear direction along with swinging movement of the swinging member 34. Further, the cylinder 36 is coaxially and integrally connected to the rear side of the tool holder 30. The tool holder 30 and the cylinder 36 which are integrally connected together are rotatably supported via two bearings held by the gear housing 12.

The striking mechanism 37 is configured to linearly move and strike the tool accessory 90 (see FIG. 3) so as to linearly drive the tool accessory 90 along the driving axis A1. In the present embodiment, the striking mechanism 37 includes a striker 371 and an impact bolt 373. The striker 371 is a striking element which is disposed within the piston cylinder 35 so as to be slidable in the front-rear direction. The impact bolt 373 is disposed in front of the striker 371 and the striker 371 collides with the impact bolt 373. Further, a space behind the striker 371 within the piston cylinder 35 is defined as an air chamber which functions as an air spring.

When the motor 2 is driven and the piston cylinder 35 is moved forward, air within the air chamber is compressed and the internal pressure increases. Therefore, the striker 371 is pushed forward at high speed and then collides with the impact bolt 373, so that the kinetic energy is transmitted to the tool accessory 90. As a result, the tool accessory 90 is linearly driven along the driving axis A1 and strikes a workpiece. When the piston cylinder 35 is moved rearward, the air within the air chamber expands and the internal pressure decreases, so that the striker 371 is retracted rearward. At this time, the tool accessory 90 is pressed against the workpiece and moved back rearward. The motion converting mechanism 31 and the striking mechanism 37 perform the hammering operation by repeating the above-described operation.

The rotation transmitting mechanism 38 is configured to transmit rotating power of the motor shaft 25 to the tool holder 30. The rotation transmitting mechanism 38 is configured as a gear speed reducing mechanism having a plurality of gears including a first gear 381 and a second gear 382. The first gear 381 is provided on a front end portion of the intermediate shaft 32 and the second gear 382 is provided on an outer periphery of the cylinder 36 and engages with the first gear 381. When the motor 2 is driven, the cylinder 36 and the tool holder 30 is rotated together around the driving axis A1 by the rotation transmitting mechanism 38, so that the tool accessory 90 held by the tool holder 30 is rotationally driven around the driving axis A1. The rotation transmitting mechanism 38 performs the drilling operation as described above.

The hammer drill 1 of the present embodiment is configured such that either one of three operation modes, that is, a hammer drill mode, a hammer mode and a drill mode, can be selected by operating a mode switching dial (not shown).

In the hammer drill mode, the motion converting mechanism 31 and the rotation transmitting mechanism 38 are both driven, so that the hammering operation and the drilling operation are performed. In the hammer mode, power transmission in the rotation transmitting mechanism 38 is interrupted and only the motion converting mechanism 31 is driven, so that only the hammering operation is performed. In the drill mode, power transmission in the motion converting mechanism 31 is interrupted and only the rotation transmitting mechanism 38 is driven, so that only the drilling operation is performed. A mode switching mechanism which operates in response to an operation of the mode switching dial is provided in the gear housing 12. However, the structure itself of the mode switching mechanism is well known and is therefore not described here.

As shown in FIG. 4, the motor 2 is housed within the motor housing 13. In the present embodiment, a compact and high-output brushless motor is employed as the motor 2. The motor 2 includes a motor body 20 and a motor shaft 25. The motor body 20 includes a stator 21 and a rotor 23, and the motor shaft 25 extends from the rotor 23.

The motor 2 is housed within the motor housing 13 such that a rotation axis A2 of the motor shaft 25 extends in the front-rear direction, in parallel to the driving axis A1. More specifically, the motor body 20 is disposed within a central part 138 of the motor housing 13. Further, the front end portion of the motor shaft 25 protrudes into the gear housing 12. A driving gear 255 is provided on this protruding part and engages with a driven gear 321 provided on a rear end portion of the intermediate shaft 32. Rotation of the motor shaft 25 is transmitted to the intermediate shaft 32 via the driving gear 255 and the driven gear 321.

As shown in FIG. 4, a fan 28 is mounted onto the motor shaft 25. The fan 28 is configured to rotate integrally with the motor shaft 25 around the rotation axis A2. The fan 28 is disposed in front of the motor body 20 within the front end part 131 of the motor housing 13. In the present embodiment, the fan 28 is configured as a centrifugal fan which is capable of sucking in air from two directions. More specifically, the fan 28 includes first blades 281 and second blades 282. The second blades 282 are integrally formed with the first blades 281, and disposed in the rear of the first blades 281. The fan 28 is configured to generate an air flow for collecting dust and an air flow for cooling the motor 2, while rotating together with the motor shaft 25. Specifically, the first blades 281 generate the air flow for collecting the dust, while the second blades 282 generate the air flow for cooling the motor 2.

Arrangements of inlets and outlets are now described. The inlets are openings for letting the air flow generated by the fan 28 into the body housing 11. The outlets are openings for sending the air flow out of the body housing 11.

As shown in FIG. 3, the first inlet 111 is formed in a lower end portion of the body housing 11 (specifically, a lower end portion of a connection between the gear housing 12 and the front end part 131 of the motor housing 13). The first inlet 111 is an opening for introducing the air flow which has passed through the dust collector 5 and from which the dust has been separated. The first inlet 111 is opened when the dust collector 5 is attached to the hammer drill 1, while the first inlet 111 is closed by an inlet cover 45 when the dust collector 5 is not attached to the hammer drill 1, which will be described later in more detail. Further, as shown in FIGS. 1 and 2, second inlets 112, 113 are provided in a rear portion of the body housing 11. The second inlets 112, 113 are openings for introducing cooling air for the motor 2. More specifically, as shown in FIG. 1, a plurality of second inlets 112 are formed in right and left side walls of a rear portion of the covering part 16. Further, as shown in FIG. 2, a plurality of second inlets 113 are formed in a rear end wall of the central part 138 of the motor housing 13 which houses the motor body 20.

Further, as shown in FIGS. 1 and 2, a plurality of outlets 114 are formed in a central portion of the body housing 11 (specifically, right and left side walls of the front end part 131 of the motor housing 13). The outlets 114 are disposed radially outward of the fan 28 so as to face the fan 28.

When the first inlet 111 is open and the fan 28 rotates, the first blades 281 generate the air flow for collecting the dust which flows into the body housing 11 (the motor housing 13) through the first inlet 111. When the dust collector 5 is attached to the hammer drill 1, this air flow is led through a suction port 712 of the dust collector 5 together with dust, and the dust is separated from the air in a process of passing through the dust collector 5. Subsequently, the air flow from which the dust has been separated flows into the body housing 11 through the first inlet 111.

Figure 5:
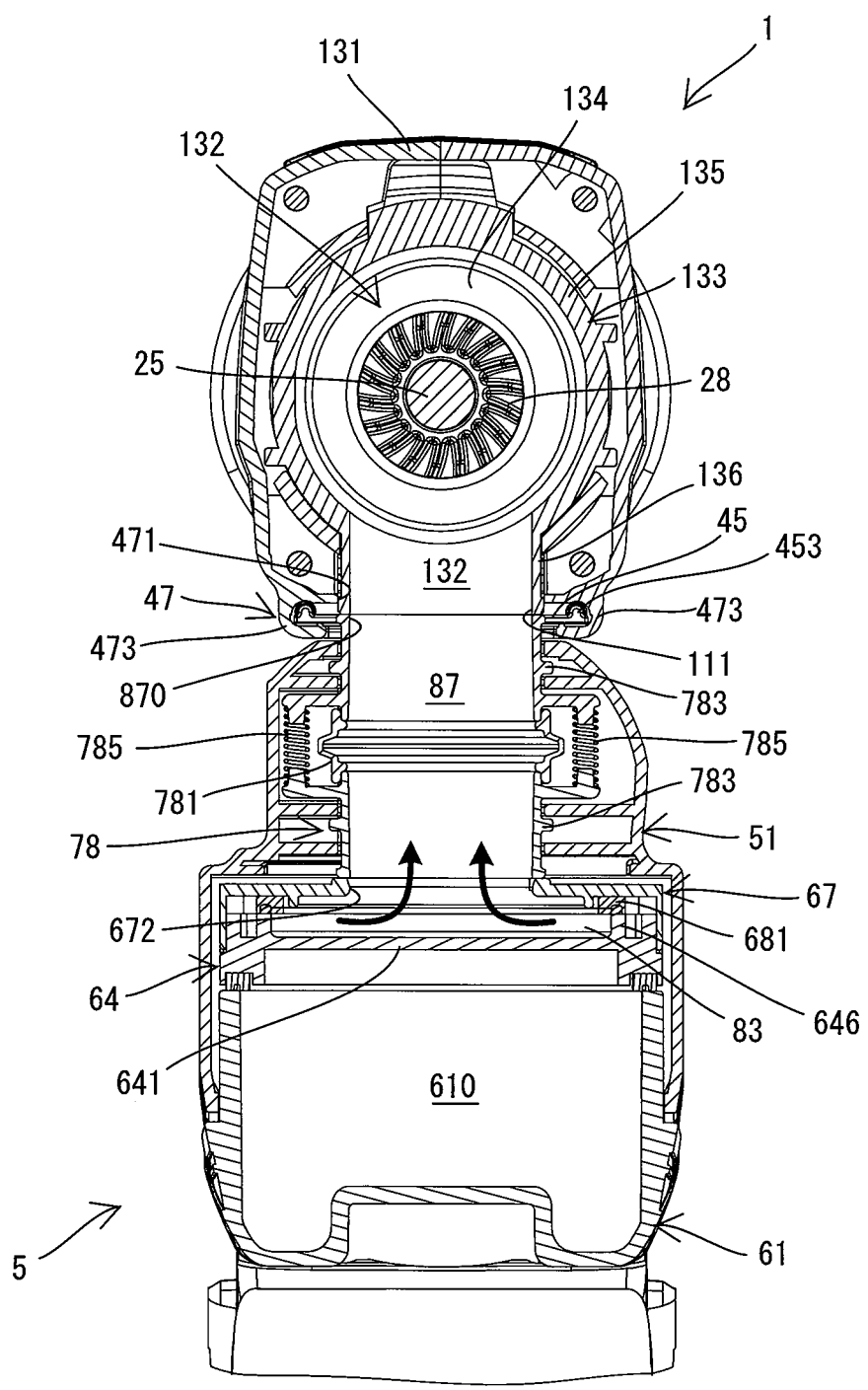
FIG. 5 is a sectional view taken along line V-V in FIG. 13.

As shown in FIG. 4, an intake chamber 132 is defined in front of the fan 28 within the front end part 131. The intake chamber 132 is defined by a partition member 133. The air flow for collecting the dust is introduced into the intake chamber 132 through the first inlet 111. As shown in FIGS. 4 and 5, the partition member 133 includes a rear wall 134, a peripheral wall 135 and a cylindrical part 136. The rear wall 134 is a generally circular wall having a through hole at the center. The peripheral wall 135 is a wall portion extending forward from an outer edge of the rear wall 134. The cylindrical part 136 extends downward from a lower end portion of the peripheral wall 135. The cylindrical part 136 has a rectangular section. A rectangular opening (see FIG. 7) provided on the lower end of the cylindrical part 136 forms the first inlet 111. As shown in FIG. 4, the partition member 133 is held between the motor housing 13 and a rear wall 126 of the support 125. An elastic sealing member 127 is disposed in a gap between the partition member 133 and the rear wall 126 to seal the gap, so as to prevent air leakage from other than the first inlet 111 and the through hole facing the first blades 281. Therefore, the air flow which is introduced into the intake chamber 132 through the first inlet 111 passes through the through hole of the rear wall 134, and is discharged to the outside of the body housing 11 from the outlets 114 (see FIG. 1) disposed radially outward of the first blades 281.

When the fan 28 rotates, the second blades 282 generate the air flow for cooling the motor 2. The air flow is led into the covering part 16 through the second inlets 112 (see FIG. 2) and is further led into the central part 138 through the second inlets 113. The air flow led into a rear end portion of the central part 138 cools the motor 2 while flowing forward through the surrounding of the motor 2 and is discharged to the outside of the body housing 11 from the outlets 114 disposed radially outward of the second blades 282.

As described above, in the present embodiment, different flow passages are respectively provided for the air flow for collecting the dust and the air flow for cooling the motor 2. These flow passages are provided on the opposite sides of the fan 28 in the front-rear direction.

A structure for removably receiving the dust collector 5 is now described.

As shown in FIGS. 1 and 2, a mounting part 41 is provided in a lower end portion of the body housing 11. The mounting part 41 is configured such that the dust collector 5 can be removably attached thereto. In the present embodiment, the mounting part 41 includes a pair of right and left guide grooves 42. The guide grooves 42 are respectively formed in lower end portions of right and left side walls of the gear housing 12 and extend in the front-rear direction, from the front end to the rear portion of the gear housing 12. Each of the guide grooves 42 is formed between two rails spaced apart from each other in the up-down direction and extending in the front-rear direction. The guide grooves 42 are formed to be open forward. The dust collector 5 has a pair of right and left guide rails 512 (see FIG. 11). The guide grooves 42 are configured such that the guide rails 512 can be engaged with the guide grooves 42 by sliding in the front-rear direction. Further, as shown in FIGS. 1 and 3, an engagement recess 43 is formed on a front lower end portion of the body housing 11 (on the front side of the guide grooves 42). The engagement recess 43 is recessed upward from the lower end surface of the body housing 11. The engagement recess 43 is configured to be engaged with an engagement projection 543 (see FIG. 11) of an operation member 54 of the dust collector 5. Attaching and detaching the dust collector 5 to and from the hammer drill 1 (the body housing 11) will be described later in detail.

The structure of opening and closing the first inlet 111 is now described.

Figure 6:
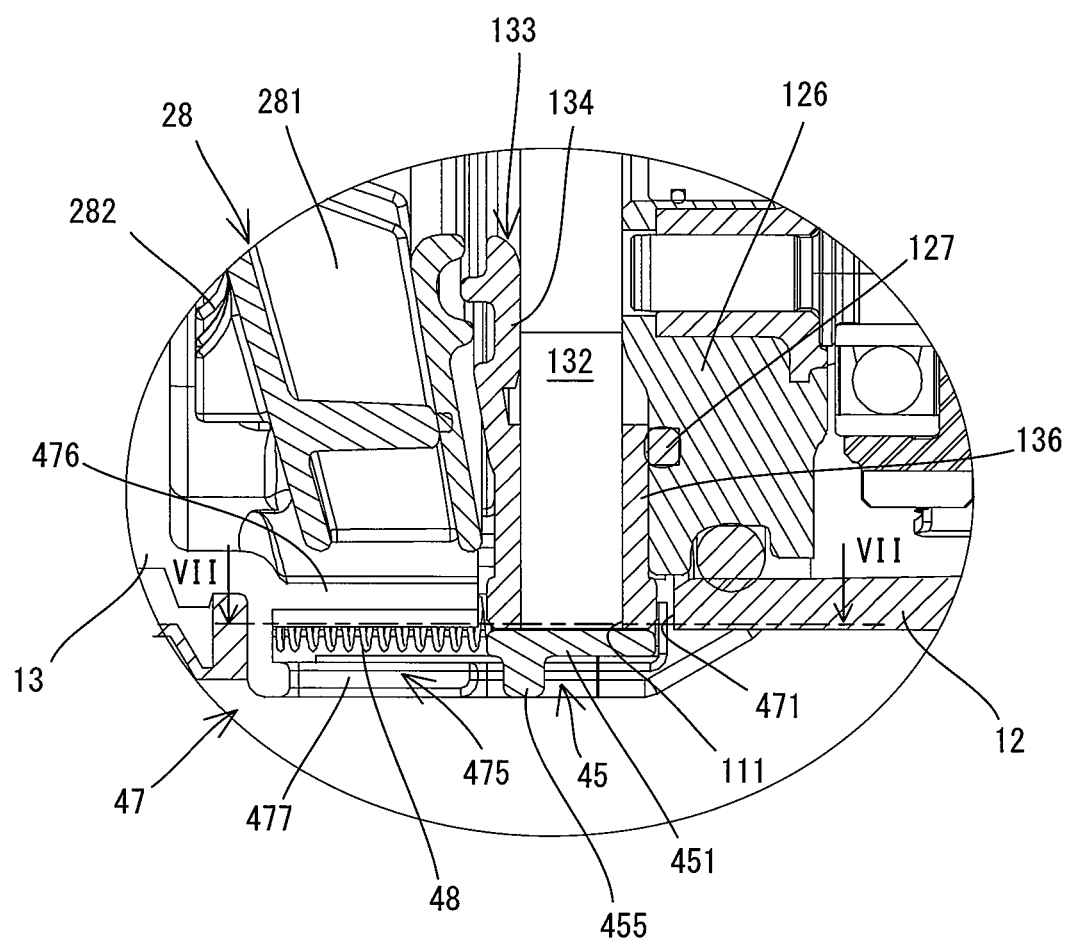
FIG. 6 is a partly enlarged view of FIG. 3, showing an inlet cover in a close position and its surrounding region.
Figure 7:
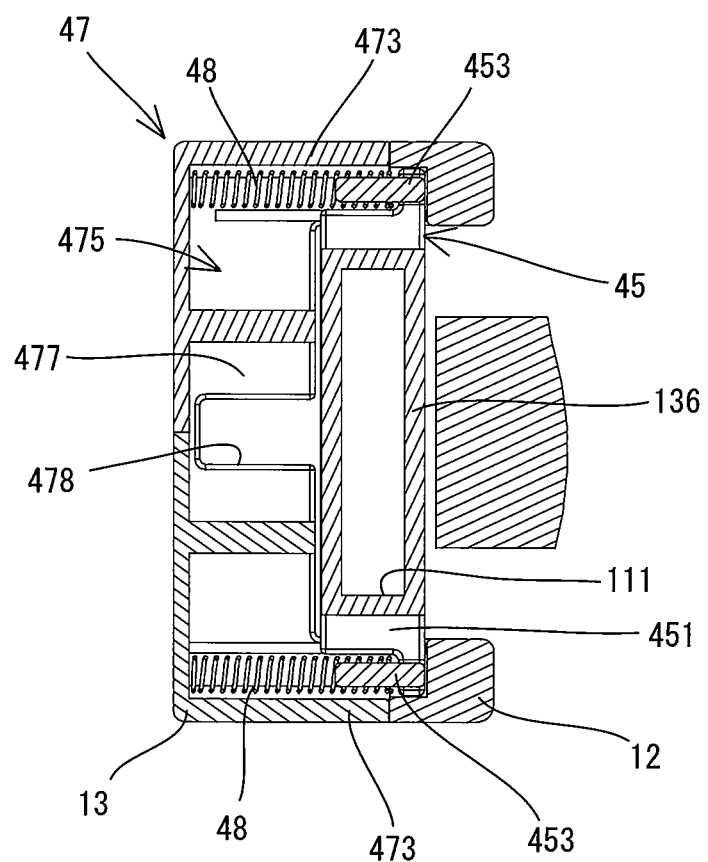
FIG. 7 is a sectional view taken along line VII-VII in FIG. 6.
Figure 7:
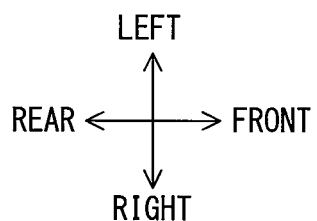

As shown in FIGS. 4, 6 and 7, the inlet cover 45 is provided on the lower end portion of the body housing 11 and configured to cover the first inlet 111.

In the present embodiment, as shown in FIG. 7, the inlet cover 45 includes a cover body 451 and a pair of guide pins 453. The cover body 451 has a rectangular plate-like shape a little larger than the first inlet 111 in a plan view. The guide pins 453 are circular columnar parts respectively extending rearward from right and left front end portions of the cover body 451. Further, as shown in FIG. 6, the inlet cover 45 has a projection 455. The projection 455 is formed in a rear central portion of the cover body 451, and protrudes downward from the lower surface of the cover body 451.

As shown in FIGS. 4 to 7, a cover holding part 47 is provided in the lower end portion of the body housing 11, at a connection between the gear housing 12 and the motor hosing 13. The cover holding part 47 is configured to hold the inlet cover 45 so as to be movable in the front-rear direction relative to the body housing 11. The cover holding part 47 includes an opening 471, a pair of guide parts 473 and a cover housing part 475.

The opening 471 is formed by connecting the gear housing 12 and the motor housing 13 (see FIGS. 5 and 6). The opening 471 has a rectangular shape and surrounds the lower end portion of the cylindrical part 136 which forms the first inlet 111. The guide parts 473 extend in the front-rear direction along right and left ends of the opening 471, respectively. Each of the guide parts 473 has a generally semi-circular cylindrical shape having closed front and rear ends and open on the side facing the other guide part 473 (see FIGS. 5 and 7). The cover housing part 475 is formed rearward of the opening 471. The cover housing part 475 is formed in a double wall structure in a bottom portion of the front end part 131 of the motor housing 13. More specifically, as shown in FIG. 6, the cover housing part 475 includes an upper wall 476 and a lower wall 477 which are arranged generally parallel and apart from each other in the up-down direction. A space between the upper wall 476 and the lower wall 477 is slightly larger than the cover body 451 and serves as a space for housing the inlet cover 45. Further, as shown in FIG. 7, a recess 478 having a rectangular shape in a plan view is formed in the lower wall 477. The recess 478 is recessed rearward from the front end of the lower wall 477. The recess 478 is formed to have a width in the left-right direction which is slightly larger than the width of the projection 455 of the inlet cover 45.

The inlet cover 45 is held between the gear housing 12 and the motor housing 13 which are connected together in the front-rear direction and held to be movable in the front-rear direction, in parallel to the driving axis A1. The inlet cover 45 is movable between a close position in which the inlet cover 45 closes the first inlet 111 and an open position in which the inlet cover 45 opens the first inlet 111. In the present embodiment, the inlet cover 45 is normally held in the close position by a biasing force of elastic members 48.

More specifically, in the present embodiment, a pair of compression coil springs are employed as elastic members 48. As shown in FIG. 7, the elastic member 48 is arranged such that its front end portion is fitted onto the guide pin 453 from the rear and its rear end portion is held in contact with the rear end of the guide part 473. The gear housing 12 and the motor housing 13 are connected together, in a state in which the elastic members 48 are compressed and the inlet cover 45 is held between the gear housing 12 and the motor housing 13 from the front and rear. As a result, the right and left guide pins 453 and elastic members 48 are fitted in the right and left guide parts 473. The inlet cover 45 is biased forward by the elastic members 48 and held in a position where the front end of the guide pin 453 is in contact with the front end of the guide part 473. At this time, the cover body 451 is placed in the close position where the cover body 451 closes the first inlet 111 under the first inlet 111.

Figure 8:
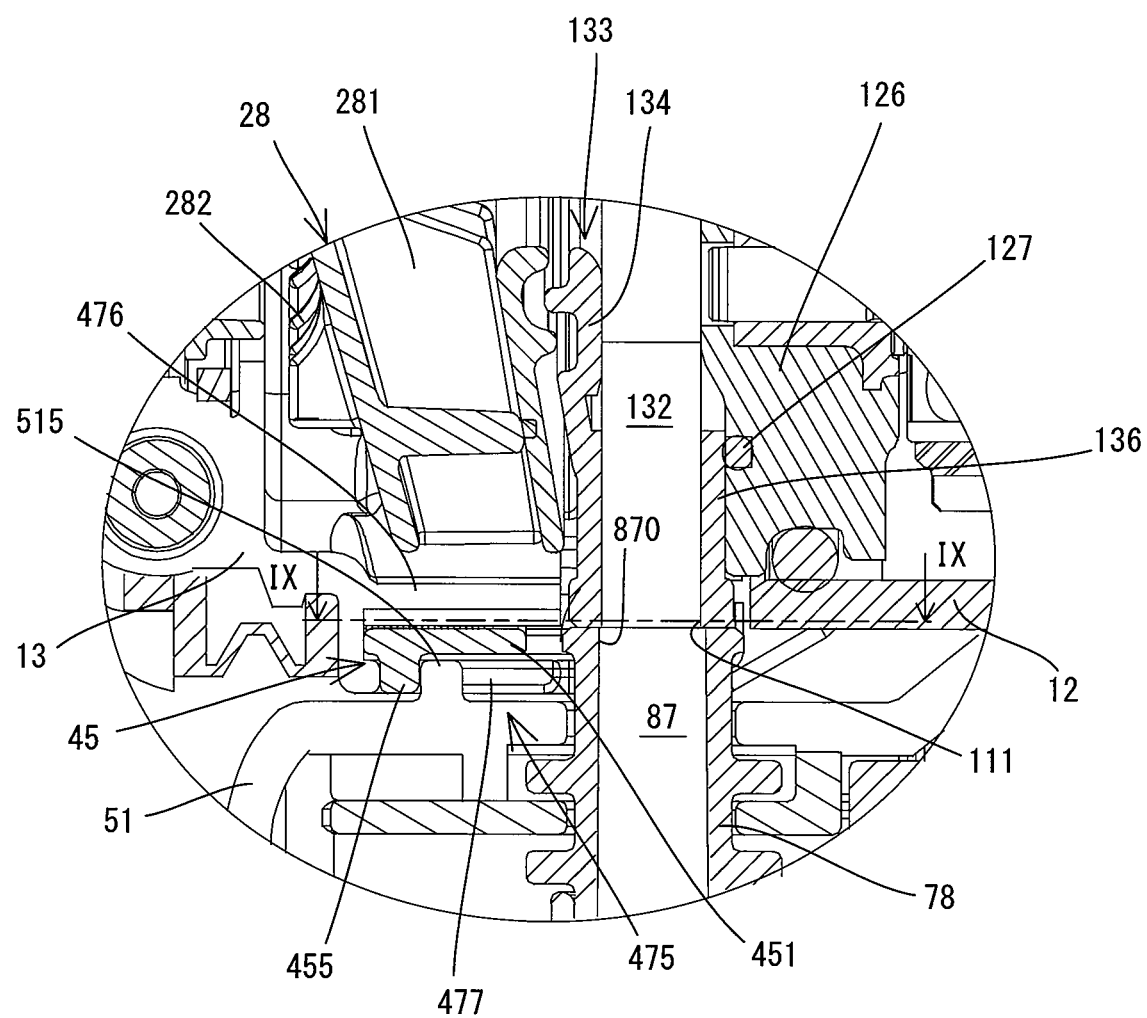
FIG. 8 is a longitudinal sectional view, showing the inlet cover in the close position and its surrounding region.
Figure 9:
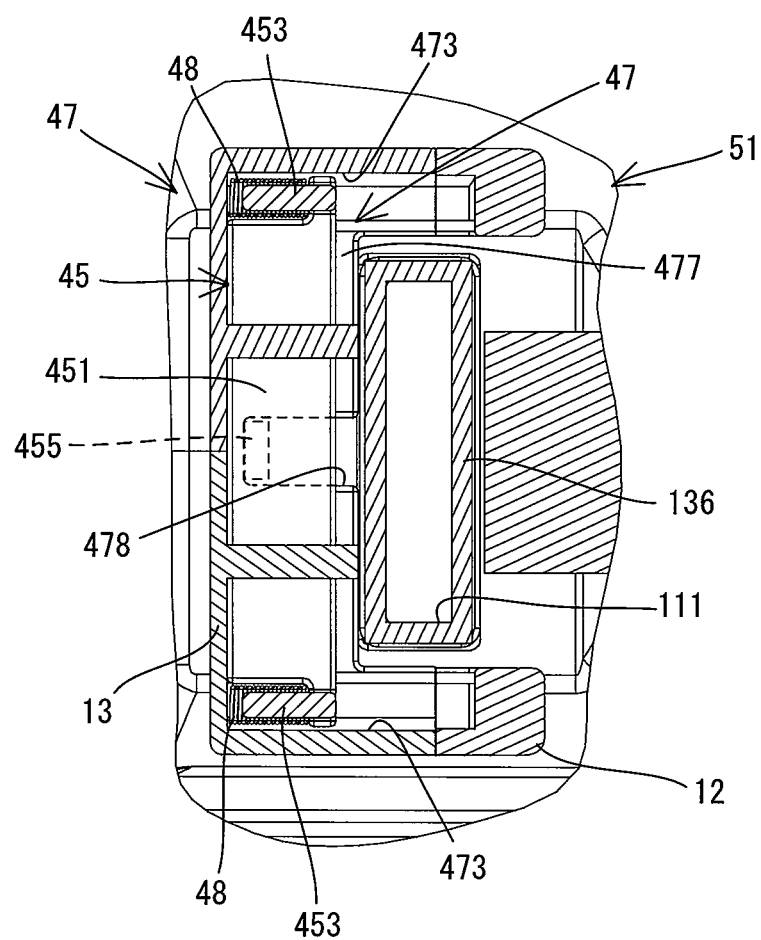
FIG. 9 is a sectional view taken along line IX-IX in FIG. 8.
Figure 9:
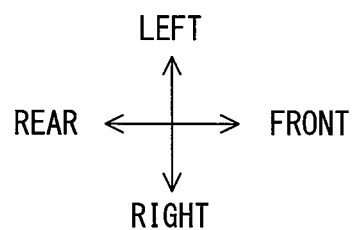

When a rearward pressing force is applied to the inlet cover 45, the inlet cover 45 moves rearward against the biasing force of the elastic members 48. Along with the rearward movement of the inlet cover 45, the cover body 451 is moved from the close position under the first inlet 111 into the housing space of the cover housing part 475 and placed in the open position where the cover body 451 opens the first inlet 111 as shown in FIGS. 8 and 9. In this process, the projection 455 provided on the lower surface of the cover body 451 enters the recess 478 of the lower wall 477. In the present embodiment, the inlet cover 45 is moved from the close position to the open position in interlock with attaching the dust collector 5 to the mounting part 41, which will be described in detail later.

The general structure of the dust collector 5 is now briefly described. In the following description, for the sake of convenience, the direction of the dust collector 5 is defined to correspond to the direction of the hammer drill 1 having the dust collector 5 attached thereto since the dust collector 5 is attached to the hammer drill 1 when used.

Figure 10:
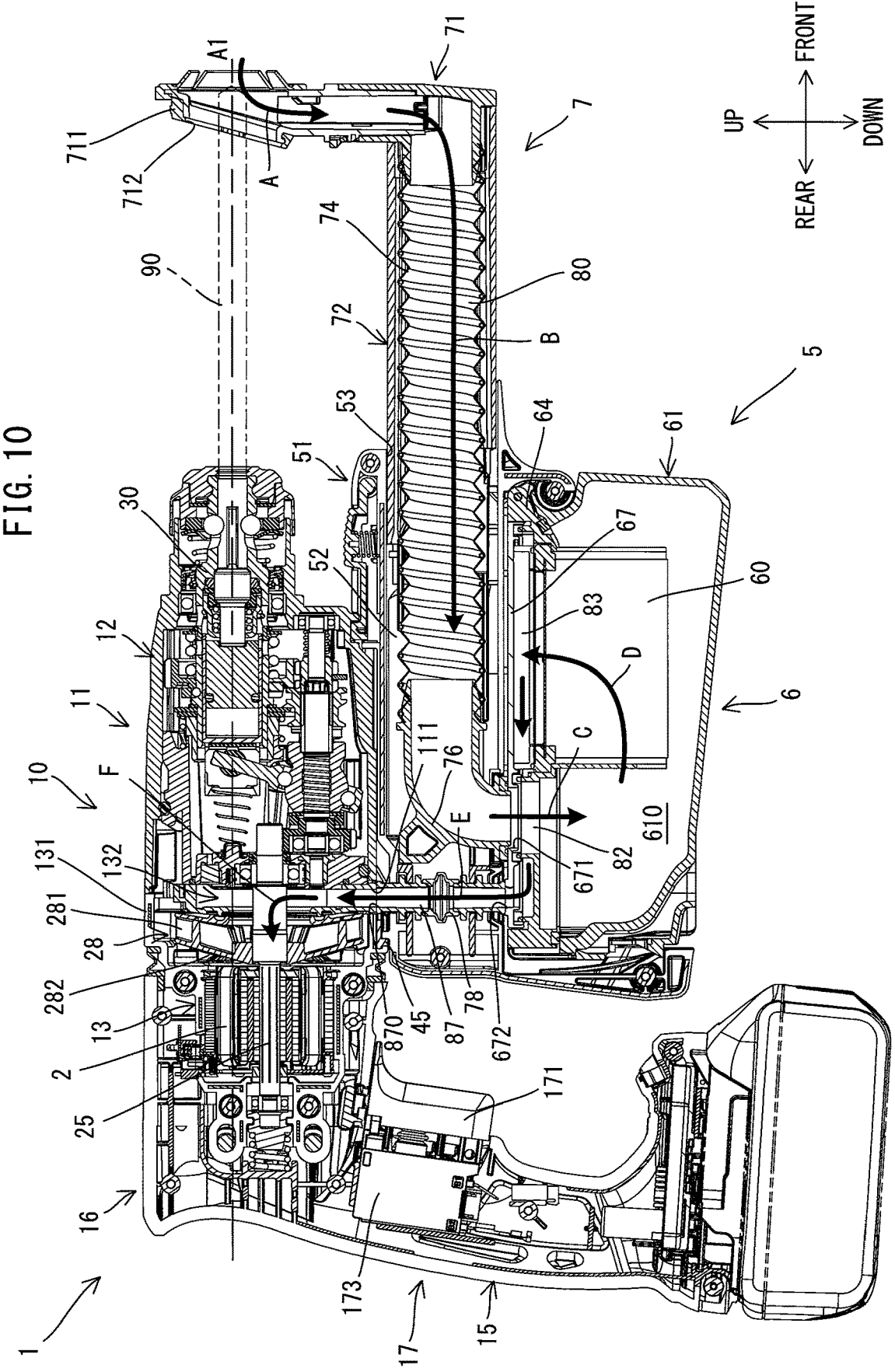
FIG. 10 is a longitudinal sectional view showing the hammer drill with a dust collector attached thereto, in a state in which a sliding part is placed in the frontmost position.

As shown in FIG. 10, the dust collector 5 includes a body 51, a dust storing part 6, a sliding part 7, a dust transfer passage 80 and a tool connection passage 87. The body 51 is configured to be removably attached to the bottom of the body 10 of the hammer drill 1. The dust storing part 6 is configured to store dust. The dust storing part 6 is removably attached to the bottom of the body 51. The sliding part 7 is L-shaped in a side view and has a dust suction port 712 on its front end. The sliding part 7 is held by the body 51 so as to be slidable in a direction parallel to the driving axis A1 (that is, in the front-rear direction) while a portion of the sliding part 7 including the suction port 712 protrudes forward from the body 51. Dust sucked in through the suction port 712 may be transferred through the dust transfer passage 80. The dust transfer passage 80 extends through the sliding part 7 and is connected to the dust storing part 6. The dust storing part 6 is disposed on the lower side of the body 51 (that is, on the side opposite the hammer drill 1) when the dust collector 5 is attached to the hammer drill 1. Further, the dust storing part 6 is connected to the first inlet 111 of the hammer drill 1 via the tool connection passage 87 which is disposed within the body 51.

When the motor 2 of the hammer drill 1 is driven, an air flow is generated in a direction in which air is taken into the body housing 11 through the first inlet 111 by the first blades 281 of the fan 28 which rotates together with the motor shaft 25. In FIG. 10, the path of this air flow is shown by a thick arrow. By this air flow, a suction force is generated to act on the suction port 172 via the tool connection passage 87, the dust storing part 6 and the dust transfer passage 80 of the dust collector 5. Dust generated during the processing operation is sucked in through the suction port 712 together with air by this suction force and led into the dust storing part 6 via the dust transfer passage 80. In the dust storing part 6, only the dust is separated from the air and stored. The air from which the dust has been separated passes through the tool connection passage 87 and flows into the body housing 11 through the first inlet 111, and is then discharged from the outlets 114 (see FIG. 1). Thus, the dust collector 5 is configured to collect the dust by using the air flow generated by the fan 28 of the hammer drill 1 (specifically, the first blades 281).

The structure of the dust collector 5 is now described in further detail.

First, the body 51 is now described. As shown in FIG. 10, in the present embodiment, the body 51 has an elongate shape, corresponding to the body 10 of the hammer drill 1, and is configured to be removably attached to the body 10. In the present embodiment, the body 51 is formed as a hollow body having a generally rectangular box-like shape and has an internal space 52 extending in the front-rear direction. Further, an opening 53 is formed in a front end of the body 51. The opening 53 is open forward and provides communication between the internal space 52 and the outside. The sliding part 7 is partly inserted into the internal space 52 through the opening 53. Further, the tool connection passage 87 is disposed in the internal space 52.

Figure 11:
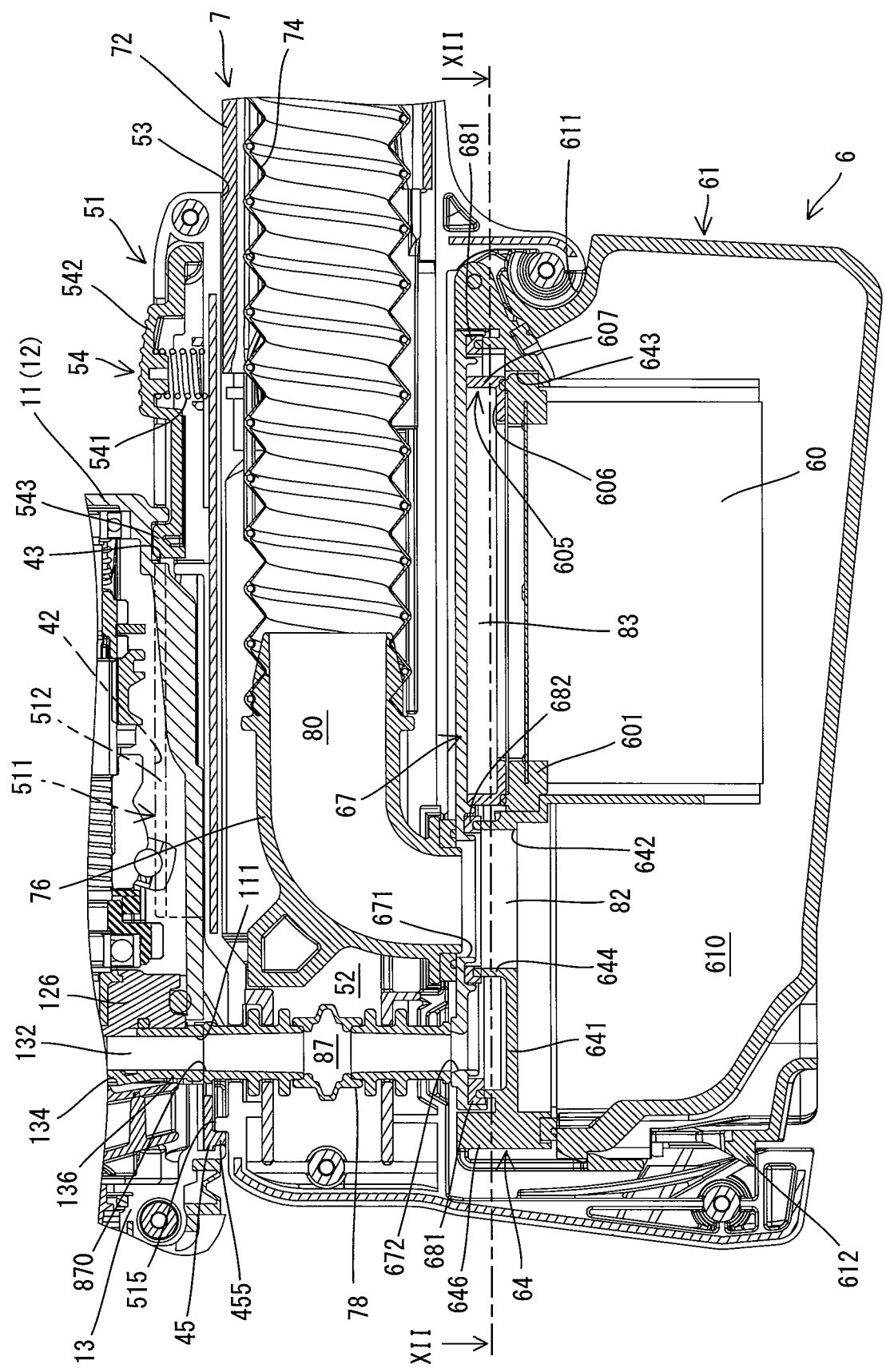
FIG. 11 is a partly enlarged view of FIG. 10, showing the internal structure of the dust collector.

Further, the body 51 has a structure for removably attaching the dust collector 5 to the hammer drill 1. More specifically, as shown in FIG. 11, an engagement part 511 is provided on the upper end portion of the body 51. The engagement part 511 is configured to be removably attached to the body 10 (specifically, to the mounting part 41 (see FIGS. 1 and 2)) of the hammer drill 1. More specifically, the engagement part 511 is formed as a pair of projections protruding upward from the right and left end portions of the body 51 and extending in the front-rear direction. The engagement parts 511 have a length which corresponds to the length of the guide grooves 42 (see FIGS. 1 and 2) of the mounting part 41 in the front-rear direction. Further, a pair of guide rails 512 protruding inward are formed on the upper end portion of the engagement part 511. The guide rails 512 are configured to be slidably engaged with the guide grooves 42 of the mounting part 41. With such a structure, in the present embodiment, the direction of attaching and detaching the dust collector 5 to and from the hammer drill 1 (the body housing 11) is set to the front-rear direction, which is parallel to the driving axis A1.

Further, the operation member 54 is provided in front of the engagement part 511 of the body 51. The operation member 54 is housed in a housing space provided in an upper front end portion of the body 51 and biased upward by a biasing spring 541. A front end portion of the operation member 54 is engaged in the housing space. The operation member 54 is held to be swingable in the up-down direction, around the front end portion of the operation member 54. The operation member 54 has an engagement projection 543 on its rear end portion and a pressing part 542 in its central portion. The engagement projection 543 protrudes upward and configured to be engaged with the engagement recess 43 of the hammer drill 1. The pressing part 542 is a portion to be pressed from the outside by a user. The operation member 54 is normally biased upward by the biasing spring 541. The pressing part 542 and the engagement projection 543 protrude upward through respective openings formed in a top wall of the body 51.

Further, in the present embodiment, the body 51 has a structure for opening the inlet cover 45 in interlock with attaching the dust collector 5 to the hammer drill 1. More specifically, as shown in FIG. 8, a pressing projection 515 is provided on the upper surface of a rear end portion of the body 51 (more specifically, rearward of the tool connection passage 87 to be described below). The pressing projection 515 is disposed in a position which corresponds to the projection 455 of the inlet cover 45 in the left-right direction. The pressing projection 515 protrudes upward to a position such that the pressing projection 515 may interfere with the projection 455 when the dust collector 5 is attached to the hammer drill 1.

As shown in FIG. 11, in the present embodiment, the dust collector 5 may be attached by way of the sliding engagement between the guide rails 512 and the guide grooves 42, the guide rails 512 being slid rearward from the front end of the guide groove 42 of the hammer drill 1. When the dust collector 5 is not attached, as described above, the inlet cover 45 is held in the close position by the biasing force of the elastic members 48 and closes the first inlet 111 (see FIG. 6). The projection 455 protrudes downward from the lower surface of the inlet cover 45 in a direction crossing the direction (the front-rear direction) of attaching and detaching the dust collector 5 to and from the hammer drill 1. Therefore, in the process of the rearward movement of the dust collector 5 to a prescribed position, the pressing projection 515 comes in contact with a front surface of the projection 455 and moves the inlet cover 45 rearward to the open position against the biasing force of the elastic member 48 (see FIG. 8).

Further, in the process of moving the dust collector 5 to the prescribed position, the user may press the pressing part 542 of the operation member 54 downward so that the engagement projection 543 is once moved downward against the biasing force of the elastic spring 541. When the user releases the pressing part 542 after moving the dust collector 5 to the prescribed position, the engagement projection 543 protrudes upward by the biasing force of the elastic spring 541 and engages with the engagement recess 43. Thus, the attachment of the dust collector 5 to the hammer drill 1 can be completed. The engagement projection 543 prevents the body housing 11 and the body 51 from moving relative to each other in the front-rear direction by engaging with the engagement recess 43, and thereby keeps the engagement between the guide grooves 42 and the guide rails 512.

When the user presses the pressing part 542 downward while the dust collector 5 is attached to the hammer drill 1, the engagement projection 543 is moved downward, so as to be disengaged from the engagement recess 43. In this state, the user can detach the dust collector 5 from the hammer drill 1 by moving the dust collector 5 forward relative to the hammer drill 1. While the pressing projection 515 is moved forward together with the dust collector 5, the inlet cover 45 is moved forward to the close position and held in the state of closing the first inlet 111 by the biasing force of the elastic member 48 (see FIG. 6). Thus, the inlet cover 45 automatically opens and closes the first inlet 111 in interlock with attaching and detaching of the dust collector 5. When the dust collector 5 is not attached, the inlet cover 45 is held in the close position, so that foreign materials such as dust are prevented from entering the body housing 11 through the first inlet 111.

The structure of the dust storing part 6 is now described. As shown in FIG. 11, in the present embodiment, the dust storing part 6 includes a container body 61, a filter holder 64, a filter 60 and an outer cover 67.

The container body 61 is formed as a hollow body having a rectangular box-like shape with an opening at its top which is open upward. The internal space of the container body 61 serves as a storing space 610 for storing dust. In the present embodiment, the container body 61 is configured to be removably attached to the lower end portion of the body 51 via engagement parts 611, 612 which are respectively formed in an upper front end portion and a lower rear end portion of the container body 61, which is a well-known structure and is not therefore described in further detail.

Figure 12:
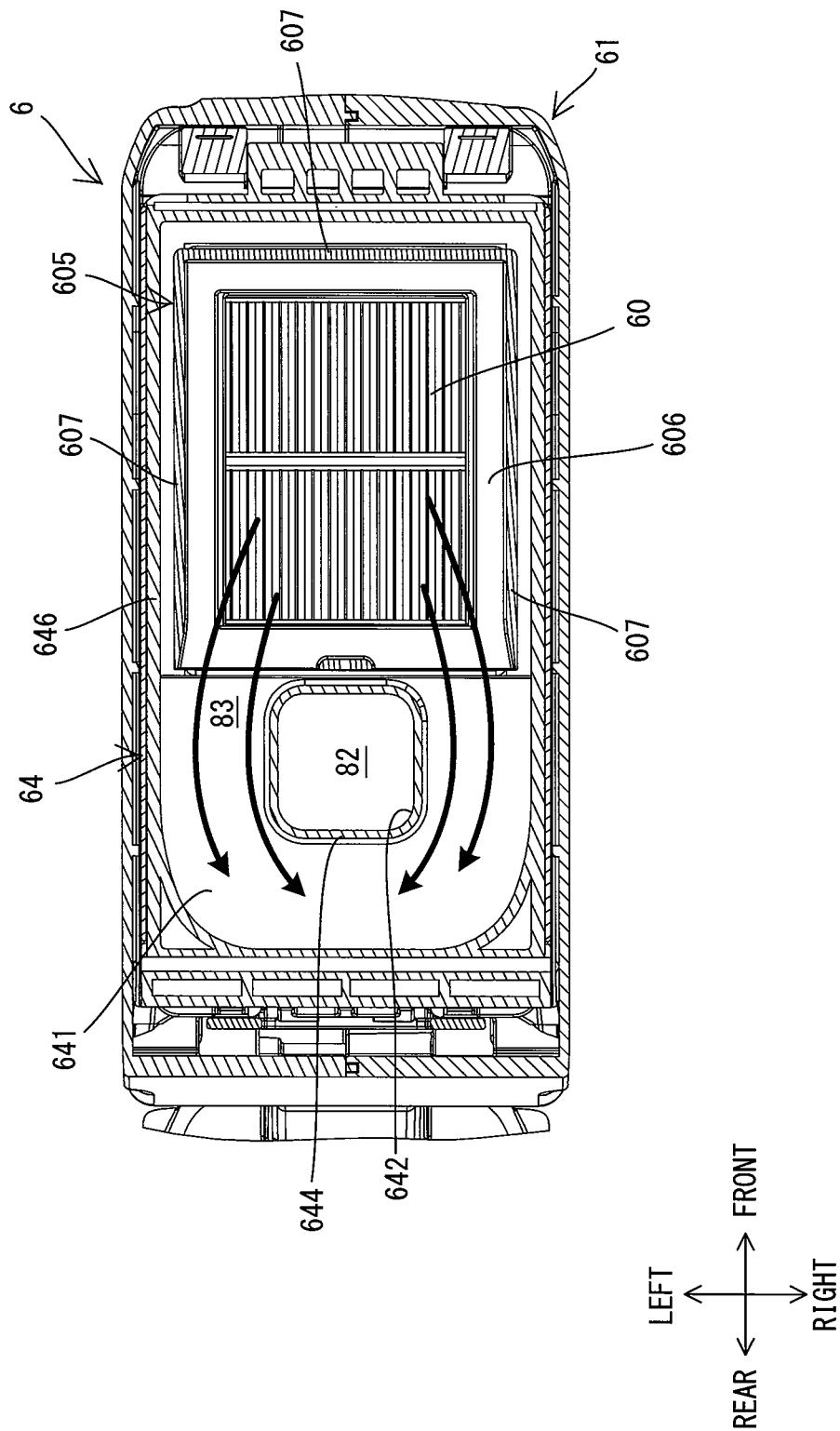
FIG. 12 is a sectional view taken along line XII-XII in FIG. 11.

The filter holder 64 is configured to hold the filter 60 and to cover the opening at the top of the container body 61. As shown in FIGS. 5, 11 and 12, in the present embodiment, the filter holder 64 includes a cover part 641 and an outer peripheral wall part 646. The cover part 641 has a generally rectangular shape in a plan view and covers the opening of the container body 61. The outer peripheral wall part 646 surrounds an outer periphery of the cover part 641 and protrudes upward. The cover part 641 has a first opening 642 and a second opening 643. The first opening 641 is formed as a through hole in a center of a rear portion of the cover part 641. A cylindrical wall 644 is formed around the first opening 641. The cylindrical wall 644 surrounds the first opening 641 and protrudes upward. The second opening 643 is formed as a through hole disposed frontward of the first opening 642.

The filter 60 is mounted in a folded state to a frame 601, which has a rectangular frame-like shape in a plan view and fitted in the second opening 643, and is held within the storing space 610. The filter 60 is formed of an air permeable material such as paper and nonwoven fabrics. The filter 60 is configured to separate dust from air when the air led into the storing space 610 passes through the filter 60.

The outer cover 67 is mounted on an upper portion of the outer peripheral wall part 646 so as to cover the filter holder 64 (specifically, the cover part 641) from above. Thus, a space is formed between the outer cover 67 and the cover part 641 of the filter holder 64 in the up-down direction. Further, the outer cover 67 has a first opening 671 and a second opening 672. The first opening 671 is a through hole which is formed to face the cylindrical wall 644. The second opening 672 is as a through hole formed rearward of the first opening 671. The outer cover 67 is mounted to the filter holder 64 in a sealing manner. More specifically, elastic sealing members 681, 682 are respectively provided to seal a gap between a lower end of an outer periphery of the outer cover 67 and the outer peripheral wall part 646 of the filter holder 64 and between an outer periphery of the first opening 671 and an upper end of the cylindrical wall 644.

Further, a retaining member 605 is disposed on the upper side of the frame 601 which holds the filter 60. The retaining member 605 includes a bottom wall 606 and a side wall 607. The bottom wall 606 has a rectangular frame-like shape generally identical to that of the frame 601 and has a rectangular through hole in the center. The side wall 607 protrudes upward from an outer peripheral edge of the bottom wall 606. Note that, in a portion which corresponds to a rear end edge of the bottom wall 606, the side wall 607 is provided only in a central region in the left-right direction. In other words, the side wall 607 surrounds the left, right and front sides of the filter 60, which is exposed upward through the through hole of the bottom wall 606, while an opening (a flow passage) through which the air flows rearward is provided on the rear side of the filter 60. The frame 601 is pressed in close contact with the cover part 641, via the retaining member 605, from above by the outer cover 67 fitted in the filter holder 64. Thus, the filter 60 is also mounted to the filter holder 64 in a sealing manner.

With such a structure, the storing space 610 of the container body 61 communicates with the space between the outer cover 67 and the cover part 64 only through the filter 60. Specifically, the storing space 610 and the space between the outer cover 67 and the cover part 64 are sealed and isolated from each other in regions other than the filter 60 allowing communication between them.

With the above-described structure, in the present embodiment, the first opening 671 of the outer cover 67 communicates with the storing space 610 through the cylindrical wall 644 and the first opening 642 of the filter holder 64. The first opening 671 is an opening to which the dust transfer passage 80 is connected, and forms an inlet for the air flow flowing into the dust storing part 6. Further, the cylindrical wall 644 defines an inflow passage 82 which connects the first opening 671 and the storing space 610. The air which has been led through the first opening 671 together with the dust from the dust transfer passage 80 passes through the inflow passage 82, and flows into the storing space 610. Further, the space between the outer cover 67 and the cover part 641 forms a communication passage 83. The communication passage 83 is a passage through which the air is led to the second opening 672 after the dust is separated from the air by the filter 60. The second opening 672 forms an outlet for the air flow flowing out of the dust storing part 6. Further, the inflow passage 82 extends in the up-down direction, through a rear central portion of the communication passage 83. Therefore, the inflow passage 82 overlaps with a portion of the communication passage 83 in the left-right direction. In other words, the inflow passage 82 overlaps with the communication passage 83 when viewed from the right or left.

The structure of the sliding part 7 is now described. As shown in FIG. 10, the sliding part 7 includes a first cylindrical part 71 having the suction port 712, and a second cylindrical part 72 connected to the first cylindrical part 71 and held by the body 51.

The first cylindrical part 71 is a cylindrical member having a generally L-shape in a side view. A suction hood 711 is provided on one end portion of the first cylindrical part 71. The suction hood 711 is configured to cover a tip end of the tool accessory 90. The suction hood 711 has the suction port 712 extending through the suction hood 711 in the front-rear direction. The end portion of the first cylindrical part 71 having the suction hood 711 and the opposite end portion are hereinafter referred to as a front end portion and a base end portion, respectively.

The second cylindrical part 72 is a linearly extending cylindrical member. The second cylindrical part 72 is arranged to extend in the front-rear direction, in parallel to the driving axis A1. The base end portion of the first cylindrical part 71 is fixedly connected to the front end portion of the second cylindrical part 72, with the front end portion of the first cylindrical part 71 facing upward. A portion of the second cylindrical part 72 including its rear end is always disposed within the internal space 52 of the body 51 through the opening 53. With such a structure, the sliding part 7 is held by the body 51 such that the suction port 712 protrudes forward from the opening 53 and the sliding part 7 can slide in the front-rear direction within the internal space 52.

Figure 13:
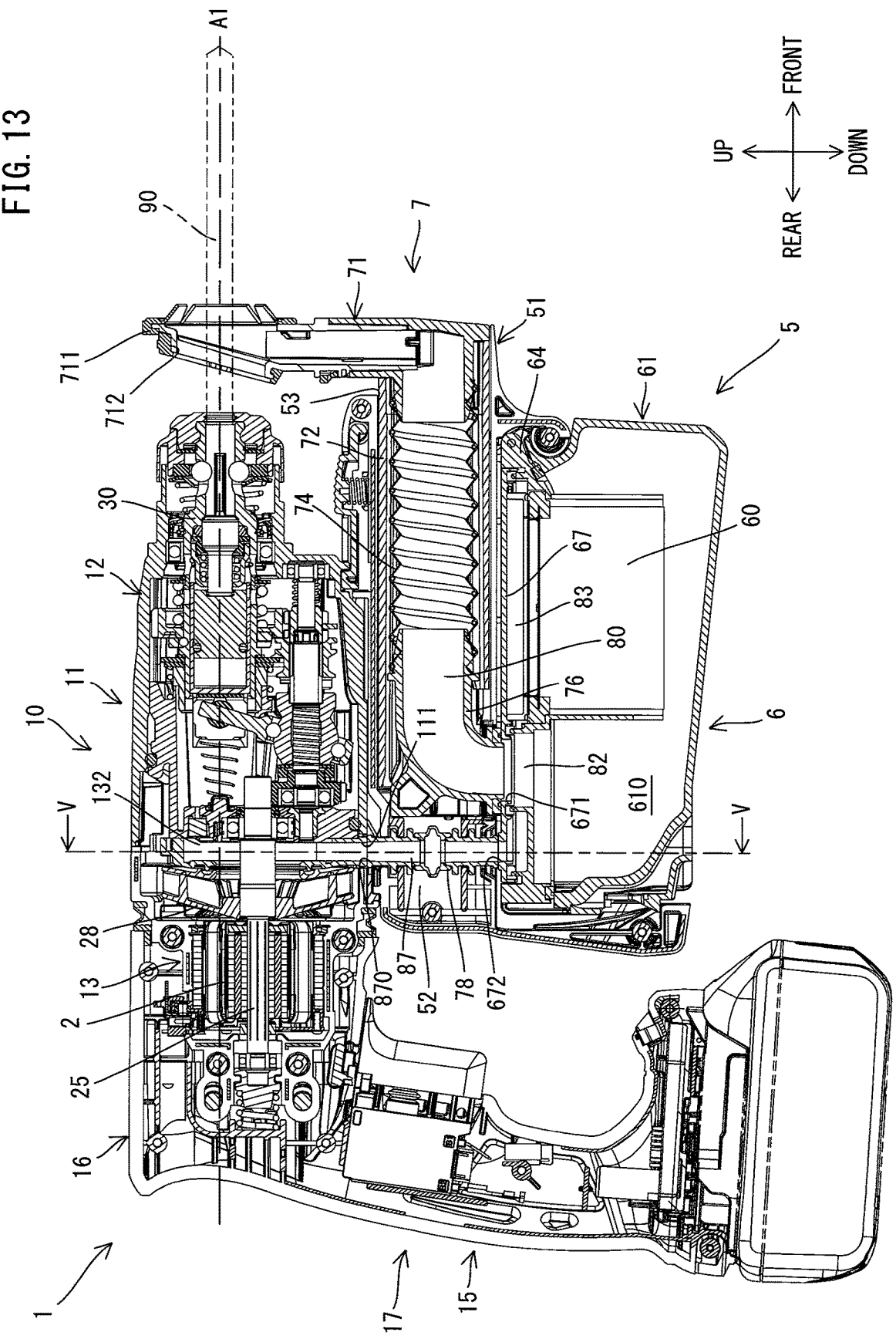
FIG. 13 is a longitudinal sectional view showing the hammer drill with the dust collector attached thereto, in a state in which the sliding part is placed in the rearmost position.

In the present embodiment, the sliding part 7 can move relative to the body 51 between a frontmost position shown in FIG. 10 and a rearmost position shown in FIG. 13. The frontmost position refers to a position of the sliding part 7 in the front-rear direction when the suction port 712 is placed at its frontmost position. The frontmost position can also be described as a position of the sliding part 7 when the length of protrusion of the sliding part 7 from the opening 53 is maximum. The rearmost position refers to a position of the sliding part 7 in the front-rear direction when the suction port 712 is placed at its rearmost position (that is, when the sliding part 7 is pushed rearward into the body 51 to the maximum extent). The rearmost position can also be described as a position of the sliding part 7 when the length of insertion of the sliding part 7 into the internal space 52 is maximum.

Further, as shown in FIG. 13, in the present embodiment, when the sliding part 7 is placed at the rearmost position, the generally whole second cylindrical part 72 (that is, a portion of the sliding part 7 extending in the front-rear direction) is disposed within the body 51. At this time, the rearmost end of the sliding part 7 (the rearmost end of the second cylindrical part 72) is located rearward of the rear end of the filter 60. Further, the rearmost end of the sliding part 7 is located forward of the tool connection passage 87 (a connection tube 78). Further, the rearmost end of the sliding part 7 is located above the first opening 671 of the outer cover 67.

The dust transfer passage 80 is now described. As shown in FIG. 10, the dust transfer passage 80 is a passage which extends within the sliding part 72 and connects the suction port 712 and the first opening 671 of the dust storing part 6. The dust sucked in from the suction port 712 passes through the dust transfer passage 80 and is transferred to the dust storing part 6. In the present embodiment, the dust transfer passage 80 is defined by the first cylindrical part 71, a hose 74 and a hose connecting part 76.

One end portion of the hose 74 is connected to the base end portion of the first cylindrical part 71 inserted into the front end portion of the second cylindrical part 72. The hose 74 is formed in a bellows shape to be extensible and contractive. The other end portion of the hose 74 is connected to one end portion of the hose connecting part 76. The hose connecting part 76 is a cylindrical member bent in an L-shape as viewed from the side. The one end portion of the hose connecting part 76 faces forward and is connected to the hose 74. The other end portion of the hose connecting part 76 is fitted in the through hole formed in the bottom wall of the body 51 and protrudes downward. An elastic sealing member is mounted on the lower end portion of the hose connecting part 76. When the dust storing part 6 is mounted to the body 51, this sealing member is pressed in close contact with the upper surface of the outer cover 67 around the first opening 671, which is the inlet for the air flow into the dust storing part 6. As a result, the dust transfer passage 80 communicates with the inflow passage 82. Note that, the hose 74 has a compression coil spring fitted therein so that the sliding part 7 is normally biased forward, that is, in a direction in which the sliding part 7 protrudes from the body 51 (the opening 53), by the elastic force of the compression coil spring.

The tool connection passage 87 is now described. As shown in FIGS. 11 and 5, the tool connection passage 87 is disposed within the internal space 52 of the body 51. The tool connection passage 87 is a passage which connects the second opening 672 of the dust storing part 6 and the first inlet 111 of the hammer drill 1 when the dust collector 5 is attached to the hammer drill 1. In the present embodiment, the tool connection passage 87 extends in the up-down direction behind the hose connecting part 76 within the rear end portion of the body 51. In the present embodiment, the tool connection passage 87 is defined by the connection tube 78.

In the present embodiment, the connection tube 78 is configured to be elastically deformable in its axial direction (the up-down direction) as a whole. More specifically, as shown in FIG. 5, the connection tube 78 includes a central part 781 and two connection end parts 783 respectively connected to an upper and lower end portions of the central part 781. The central part 781 is a cylindrical member which is extensible and contractive. The two connection end parts 783 are formed of an elastic element into the same shape and arranged symmetrically in the up-down direction across the central part 781. The two connection end parts 783 are connected together to be movable in the up-down direction via two elastic members 785 (specifically, compression coil springs) provided on the right and left sides. The two connection end parts 783 are biased in a direction away from each other by the elastic force of the elastic members 785. An upper end portion of the upper connection end part 783 and a lower end portion of the lower connection end part 783 respectively protrude from the through holes formed in the top and the bottom walls of the body 51.

The lower end of the connection tube 78 (the lower end of the lower connection end part 783) is pressed in close contact with the upper surface of the outer cover 67 around the second opening 672. As a result, the tool connection passage 87 is connected to the second opening 672, which is the outlet for the air flow flowing out of the dust storing part 6. Further, when the dust collector 5 is attached to the hammer drill 1 (the body housing 11), the upper end of the connection tube 78 (the upper end of the upper connection end part 783) is pressed in close contact with the lower surface of the body housing 11 around the first inlet 111 by the elastic force of the elastic members 785. Thus, the second opening 672 formed as the outlet of the dust storing part 6 is connected to the first inlet 111 of the hammer drill 1 via the tool connection passage 87.

In the present embodiment, as described above, the dust transfer passage 80, the inflow passage 82, the dust storing space 610, the communication passage 83 and the tool connection passage 87 are connected in this order and form a suction passage as a whole through which passes the dust-collecting air flow generated by the fan 28. Further, an upper end of the tool connection passage 87 (an upper end opening of the connection tube 78) which forms a downstream end of the suction passage forms an outlet 870 of the dust collector 5.

Operations of the hammer drill 1 and flows of air and dust in the hammer drill 1 and the dust collector 5 are now described. As shown in FIG. 10, when the dust collector 5 is attached to the hammer drill 1 and the trigger 171 is pulled by a user, the motor 2 is driven and the fan 28 is rotated. Then, the air flow for cooling the motor 2 is generated by the second blades 282 as described above. This air flow is led in from the second inlets 112, 113 (see FIGS. 1 and 2) and cools the motor 2, and is thereafter discharged from the outlet 114 (see FIG. 1).

Meanwhile, the dust-collecting air flow which is led into the body housing 11 through the first inlet 111 is generated by the first blades 281 as described above. This air flow is led in, as shown by arrow A, together with the dust through the suction port 712 of the dust collector 5 which surrounds the tool accessory 90, and flows rearward through the dust transfer passage 80, as shown by arrow B. Subsequently, as shown by arrow C, the air flow enters the dust storing part 6 through the first opening 671 and flows downward into the storing space 610 through the inflow passage 82. Then, as shown by arrow D, the air flow further passes upward through the filter 60 disposed frontward of the first opening 671 (the inflow passage 82). At this time, the dust contained in the air is separated (captured) by the filter 60 and stored in the storing space 610.

The air from which the dust has been separated through the filter 60 flows rearward toward the second opening 672 (see FIG. 11) through the communication passage 83, as shown by arrows in FIG. 12. As described above, the inflow passage 82 extends in the up-down direction through the rear central portion of the communication passage 83. Therefore, the air flowing through the communication passage 83 passes the outside (the right and left sides) of the inflow passage 82 (the cylindrical wall 644) and is led to the second opening 672 disposed rearward of the inflow passage 82. The direction (generally rearward direction) in which the air flows through the communication passage 83 crosses the direction (generally downward direction) in which the air flows through the inflow passage 82.

As shown in FIG. 10, the air flowing out through the second opening 672 is led upward through the tool connection passage 87 and flows into the body housing 11 (the intake chamber 132) through the first inlet 111, as shown by arrow E. Then, the air passes rearward through the through hole of the rear wall 134 (see FIG. 4), as shown by arrow F, and is discharged to the outside of the body housing 11 from the outlets 114 formed radially outward of the fan 28, as shown by arrows in FIG. 1.

As described above, in the present embodiment, the dust collector 5 may be attached and detached to and from the guide grooves 42 of the body housing 11 of the hammer drill 1 in parallel to the driving axis A1, via the guide rails 512. Further, the tool accessory 90 may be coupled to the hammer drill 1 such that the axis of the tool accessory 90 coincides with the driving axis A1. Thus, the axial direction of the tool accessory 90 is parallel to the direction of attaching and detaching the dust collector 5. Therefore, the dust collector 5 can be attached and detached while the suction port 712 is properly placed to surround the tool accessory 90, even with the tool accessory 90 attached to the hammer drill 1.

Further, in the hammer drill 1, the inlet cover 45 automatically opens and closes the first inlet 111 in interlock with an attaching/detaching movement of the dust collector 5. Therefore, when the dust collector 5 is not attached, the first inlet 111 is closed, so that entry of dust into the body housing 11 can be prevented. Further, in the hammer drill 1, the motor 2 is housed in the body housing 11 such that the motor shaft 25 extends in parallel to the driving axis A1. Therefore, compared with a structure in which the motor shaft 25 extends in a direction crossing the driving axis A1, the body housing 11 can be formed compact.

Further, the body 10 and the grip part 17 of the hammer drill 1 are arranged in an L-shape as a whole. Therefore, a dead space is formed in a region which is forward of the grip part 17 and below the body 10. In the present embodiment, the guide grooves 42, which serve as a mounting part for the dust collector 5, are formed in the lower end portion of the body housing 11. Thus, the power tool having the dust collector 5 attached thereto can be made compact as a whole, while the dead space is effectively utilized as a space in which the dust collector 5 is disposed. Further, the guide grooves 42 are configured as slide guides with which the guide rails 512 of the dust collector 5 can be slidably engaged, so that attachment and detachment of the dust collector 5 can be facilitated.

In the present embodiment, the first inlet 111 and the motor body 20 are arranged on the opposite (front and rear) sides of the fan 28 in the extending direction of the motor shaft 25 (the front-rear direction). Further, the outlets 114 are disposed radially outward of the fan 28. Thus, the dust-collecting air flow which has passed through the suction passage of the dust collector 5 and has been led in through the first inlet 111, flows out of the body housing 11 through the outlets 114, without flowing to the motor body 20. With such a structure, the passage for the dust-collecting air flow within the body housing 11 can be formed relatively short, so that excellent air blowing efficiency can be maintained. Further, even if the dust enters the body housing 11 together with the air through the first inlet 111, the dust can be discharged through the outlets 114, before reaching the motor body 20.

Further, in the present embodiment, in the body housing 11, the second inlets 112, 113 for introducing the air flow for cooling the motor 2 and the fan 28 are arranged on the opposite sides of the motor body 20 in the extending direction of the motor shaft 25 (the front-rear direction). Therefore, the motor 2 can be cooled by the air flow (motor-cooling air) led in through the second inlets 112, 113. Furthermore, the passage for the air for cooling the motor 2 can also be formed relatively short, so that excellent air blowing efficiency can be maintained.

In the present embodiment, the fan 28 has the first blades 281 for generating the dust-collecting air flow which flows into the body housing 11 through the first inlet 111, and the second blades 282 for generating the motor-cooling air flow which flows into the body housing 11 through the second inlets 112, 113. Therefore, compared with a structure in which a fan for collecting dust and a fan for cooling a motor are separately provided, the structure can be simplified, so that space saving can be achieved.

In the present embodiment, the inlet cover 45 is held between the gear housing 12 for housing the driving mechanism 3 and the motor housing 13 for housing the motor 3, so as to be movable in parallel to the driving axis A1. Further, the inlet cover 45 is biased toward the close position by the elastic members 48. With such a structure, the inlet cover 45 which is capable of opening and closing the first inlet 111 can be easily mounted to the body housing 11 simply by connecting the gear housing 12 and the motor housing 13 with the inlet cover 45 disposed therebetween.

Further, the inlet cover 45 has the projection 455 protruding in the direction (downward direction) crossing the direction of attaching and detaching the dust collector 5. In interlock with the attaching of the dust collector 5, the pressing projection 515 of the dust collector 5 comes in contact with the projection 455 and the inlet cover 45 is moved to the open position. The structure for moving the inlet cover 45 to the open position in interlock with the attaching of the dust collector 5 can be thus realized with the simple structure of the projection 455.

The dust collector 5 of the present embodiment can be attached on the lower side of the body housing 11 of the pistol-type (L-shaped) hammer drill 1. Therefore, a space for placing a user's hand needs to be secured between the dust collector 5 and the grip part 17 in the front-rear direction. Further, in the dust collector 5, the dust transfer passage 80 extends within the sliding part 7 and connects the suction port 712 of the sliding part 7 and the first opening 671 of the dust storing part 6. With the dust collector 5 having such a structure, the drilling operation may be performed while the suction port 712 surrounds the tool accessory 90 and pressed against a workpiece. As the drilling operation proceeds and the tool accessory 90 digs into the workpiece (in other word, as the drilled hole is deepened), the sliding part 7 is pushed rearward in the internal space 52. The length of the tool accessory 90 to be used in the hammer drill 1 is fixed to some extent, and accordingly, shortening of the length of the sliding part 7 in the front-rear direction may be limited. Therefore, shortening of the length of the body 51 which holds the sliding part 7 so as to be slidable in the front-rear direction may also be limited.

In a conventional dust collector, generally, an inlet, through which air is led in together with dust, is disposed in a relatively front portion of a dust storing part, and a filter is disposed rearward of the inlet. Therefore, the portion of the dust storing part on the rear side of the inlet tends to be relatively large. On the contrary, in the present embodiment, the filter 60 is disposed forward of the first opening 671 (the inlet for air flowing into the dust storing part 6), so that the portion of the dust storing part 6 which exists rearward of the first opening 671 can be made as compact as possible. Thus, a space required between the dust collector 5 and the grip part 17 can be easily secured.

Further, in a conventional dust collector, generally, a tool connection part for connecting an outlet of a dust storing part and an inlet of a tool body is disposed above a filter. Accordingly, a body and a storing part of the dust collector need to have a part protruding rearward of the outlet to a certain extent. On the contrary, in the present embodiment, the tool connection passage 87 for connecting the second opening 672 (the outlet for air flowing out of the dust storing part 6) and the first inlet 111 is disposed within the rear end portion of the body 51. Further, the filter 60 is disposed forward of the second opening 672. Therefore, also in terms of this point, the portions of the body 51 and the dust storing part 6 which exist rearward of the second opening 672 can be made as compact as possible, so that a space required between the dust collector 5 and the grip part 17 can be easily secured.

Further, even when the body 51 is shortened to the maximum possible extent in the front-rear direction within the above-described limit, a certain length is secured for the body 51 on the front side of the first opening 671, in order to hold the sliding part 7. Specifically, as shown in FIG. 13, the body 51 has such a length that the generally whole second cylindrical part 72 can be disposed within the body 51. Accordingly, about the same length as the body 51, and thus a space for arranging the filter 60, can be secured for the dust storing part 6 on the front side of the first opening 671. Thus, like in the present embodiment, the length of the whole dust collector 5 in the front-rear direction can be rationally shortened by arranging the filter 60 forward of the first opening 671. The same is true for relative arrangement of the second opening 672 and the filter 60.

In the present embodiment, the second opening 672 of the dust storing part 6 is disposed rearward of the first opening 671, and the tool connection passage 87 which connects the second opening 672 and the first inlet 111 of the hammer drill 1 is disposed within the internal space 52 of the body 51. Further, the dust transfer passage 80 extending within the sliding part 7 is connected to the first opening 671. By arranging the second opening 672 rearward of the first opening 671, efficient arrangement can be realized while avoiding interference between the tool connection passage 87 and the dust transfer passage 80.

The dust storing part 6 includes the inflow passage 82 which connects the first opening 671 and the storing space 610, and the communication passage 83 which communicates with the storing space 610 via the filter 60 and is connected to the second opening 672. The air flow from which the dust has been separated by the filter 60 passes through the communication passage 83. The communication passage 83 is arranged to overlap with the inflow passage 82 in the left-right direction. Such a structure can let the air which has passed through the filter 60 arranged forward of the first opening 671 pass the right and left sides of the inflow passage 82 within the communication passage 83 and lead the air to the second opening 672 rearward of the first opening 671.

Further, in the present embodiment, the filter holder 64 is mounted on the upper end portion of the container body 61 so as to close the opening of the container body 61, and holds the filter 60 within the container body 61. Further, the outer cover 67 is mounted on the upper end portion of the filter holder 64 so as to cover the filter holder 64 from above in a sealing manner. With such a simple structure, the communication passage 83 can be formed on the upper side of the storing space 610 (in other words, between the dust storing space 610 and the body 51 in the up-down direction) while leakage of air is prevented. Further, the filter 60 is mounted to the filter holder 64 in a sealing manner. This structure can prevent the air including the dust from passing through between the filter 60 and the filter holder 64 and entering the communication passage 83.

Further, in the present embodiment, the dust storing space 610 includes a space below the second opening 672. A user may perform the drilling operation with the tool accessory 90 pointed upward, that is, with the suction port 712 side or front side of the dust collector 5 facing upward. In such a case, the dust which has been separated by the filter 60 may move to a rear region in the dust storing part 6 by gravity and gather therein. The space below the second opening 672 is located on the rear side of the filter 60, so that clogging of the filter 60 can be suppressed by gathering the dust in this space.

Further, in the present embodiment, the air flow for sucking the dust is generated by the fan 28 of the hammer drill 1, so that the dust collector 5 is not required to have a mechanism for generating such an air flow. Therefore, increase in size of the dust collector 5 can be prevented.

The above-described embodiment is merely an example, and a power tool according to the present invention is not limited to the above-described structure of the hammer drill 1. For example, the following modifications or changes may be made. Further, one or more of these modifications or changes may be applied in combination with the hammer drill 1 shown in the embodiment, or with the claimed invention.

In the above-described embodiment, the hammer drill 1 is described as an example of the power tool, but the present invention may be applied to other drilling tools, such as an electric drill and a vibration drill which are configured to rotationally drive the tool accessory 90 around the driving axis A1. The structures of the motor 2, the fan 28, the driving mechanism 3, the body housing 11 for housing the motor 2 and the driving mechanism 3, the handle housing 15 including the grip part 17, and the inlet cover 45 may be appropriately modified or changed according to the drilling tool.

The structures of the body 51, the dust storing part 6 and the sliding part 7 of the dust collector 5 may also be appropriately modified or changed.

For example, the attaching/detaching structures of the body 51 and the hammer drill 1 are not limited to the guide rails 512 and the guide grooves 42 of the above-described embodiment, respectively. Contrary to the arrangement of the above-described embodiment, the hammer drill 1 may have guide rails, and the dust collector 5 may have guide grooves. Alternatively, for example, a projection protruding in parallel to the driving axis A1 may be provided on one of the hammer drill 1 and the dust collector 5, and a recess which can engage with the projection may be provided in the other of the hammer drill 1 and the dust collector 5. The direction of attaching and detaching the dust collector 5 to and from the hammer drill 1 may be the up-down direction, rather than the front-rear direction parallel to the driving axis A1. Further, the attaching/detaching structure itself in the dust collector 5 need not necessarily be provided in the body 51, and it may be provided in a different portion or provided separately from the dust collector 5. For example, the dust collector 5 may be attached to the lower side of the tool body of the hammer drill 1 or another drilling tool by using a belt having a fastener, or an annular member formed of a flexible material such as rubber.

In the above-described embodiment, the dust transfer passage 80 is defined by the first cylindrical part 71, the hose 74 and the hose connecting part 76. However, the dust transfer passage 80 only needs to be configured to transfer dust together with air from the suction port 712 to the dust storing part 6. For example, the dust transfer passage 80 may be defined only by an extensible hose for connecting the suction port 712 and the first opening 671 serving as the inlet of the dust storing part 6. The dust storing part 6 does not need to be removably attached to the body 51, but it may be integrally formed with the body 51. Further, the structure for holding the filter 60 in the dust storing part 6 and the structure for mounting the filter holder 64 or the outer cover 67 may be appropriately changed or modified. The shape and arrangement of the tool connection passage 87 (the connection tube 78) in the internal space 52 may be appropriately changed or modified according to the arrangement of the second opening 672 serving as the outlet of the dust storing part 6 and the first inlet 111 of the hammer drill 1. For example, the tool connection passage 87 may extend slightly obliquely relative to the up-down direction or may be at least partly curved. The connection tube 78 which defines the tool connection passage 87 may be a single elastic cylindrical member, in place of the structure consisting of a plurality of parts connected together.

Correspondences between the features of the embodiment and the features of the invention are as follows. The hammer drill 1 is an example that corresponds to the "drilling tool" according to the present invention. The body 10, the first inlet 111, the grip part 17 and the fan 28 are examples that correspond to the "tool body", the "inlet", the "grip part" and the "fan", respectively, according to the present invention. The dust collector 5 is an example that corresponds to the "dust collector" according to the present invention. The body 51, the internal space 52 and the opening 53 are examples that correspond to the "body", the "internal space" and the "opening", respectively, according to the present invention. The dust storing part 6, the first opening 671, the filter 60, the storing space 610 and the second opening 672 are examples that correspond to the "dust storing part", the "inlet", the "filter", the "dust storing space" and the "outlet", respectively, according to the present invention. The sliding part 7 and the suction port 712 are examples that correspond to the "sliding part" and the "suction port", respectively, according to the present invention. The dust transfer passage 80 is an example that corresponds to the "dust transfer passage" according to the present invention. The tool connection passage 87 is an example that corresponds to the "tool connection passage" according to the present invention. The inflow passage 82 and the communication passage 83 are examples that correspond to the "inflow passage" and the "communication passage", respectively, according to the present invention. The container body 61, the filter holder 64 and the outer cover 67 are examples that correspond to the "container body", the "filter holder" and the "cover", respectively, according to the present invention. The motor 2, the motor body 20, the stator 21, the rotor 23, and the motor shaft 25 are examples that correspond to the "motor", the "motor body", the "stator", the "rotor", and the "motor shaft", respectively, according to the present invention. The inlet cover 45 is an example that corresponds to the "covering member" according to the present invention. The mounting part 41 is an example that corresponds to the "mounting part" according to the present invention.

In view of the nature of the present invention and the above-described embodiment, the following aspects are provided. Any one or more of the aspects may be applied in combination with the hammer drill 1 of the embodiment and its modifications or with the claimed invention.

(Aspect 1)

The inlet may be disposed rearward of a center of the storing part in the front-rear direction.

(Aspect 2)

The tool connection passage may extend in the up-down direction.

(Aspect 3)

The outlet may be disposed adjacent to and rearward of the inlet.

(Aspect 4)

The communication passage may be disposed on an upper side of the dust storing space, and the dust storing space and the communication passage may be sealed from each other in regions other than the filter, the filter allowing communication between the dust storing space and the communication passage.

(Aspect 5)

The communication passage may be disposed on an upper side of the dust storing space, and the inflow passage may extend in the up-down direction through the communication passage and connect the inlet and the dust storing space.

(Aspect 6)

The air flow passing through the communication passage may pass the outside of the inlet and flow to the outlet in a direction crossing a direction of air flow passing through the inflow passage.

(Aspect 7)

A rearmost end of the sliding part may be located rearward of a rear end of the filter when the sliding part is placed at a rearmost position within a movable range in the front-rear direction.

(Aspect 8)

A rearmost end of the sliding part may be located forward of the tool connection passage when the sliding part is placed at a rearmost position within a movable range in the front-rear direction.

(Aspect 9)

A rearmost end of the sliding part may be located rearward of a front end of the inlet when the sliding part is placed at a rearmost position within a movable range in the front-rear direction.

(Aspect 10)

The body and the dust storing part may have generally the same length in the front-rear direction.

Further, in view of an object of providing an improvement in a power tool to and from which a dust collector can be attached and detached, the following aspects 11 to 17 are provided.

(Aspect 11)

A power tool configured to perform a processing operation by driving a tool accessory attached to the power tool such that an axis of the tool accessory coincides with a prescribed driving axis, the power tool being configured such that a dust collector for collecting dust generated during the processing operation can be removably attached thereto, the dust collector including a suction port disposed to surround the tool accessory, an outlet and a suction passage extending from the suction port to the outlet, the power tool comprising:

a tool body including a mounting part and a first inlet, the mounting part being configured such that the dust collector can be removably attached thereto, the first inlet communicating with the suction passage via the outlet when the dust collector is attached to the mounting part;

a motor including a motor body and a motor shaft, the motor body including a stator and a rotor, the motor shaft extending from the rotor in parallel to the driving axis;

a fan mounted on the motor shaft so as to rotate together with the motor shaft, the fan having a first blade configured to generate a dust-collecting air flow, the dust-collecting air flow flowing through the suction passage and into the tool body through the first inlet when the dust collector is attached to the mounting part; and a covering member configured to open and close the first inlet, wherein:

the mounting part is configured such that the dust collector is attached to and detached from the mounting part in parallel to the driving axis, and the covering member is configured to be held in a close position of closing the first inlet when the dust collector is not attached to the mounting part, and also configured to be moved to an open position of opening the first inlet in interlock with attaching of the dust collector to the mounting part.

In the power tool according to the present aspect, the dust collector may be attached and detached to and from the mounting part of the tool body in parallel to the driving axis. Further, the tool accessory may be attached to the power tool such that the axis of the tool accessory coincides with the driving axis. Thus, the axial direction of the tool accessory is parallel to the direction of attaching and detaching the dust collector. Therefore, the dust collector can be attached and detached while the suction port is properly placed to surround the tool accessory, even in a state in which the tool accessory is attached to the power tool. Further, the covering member automatically opens and closes the first inlet in interlock with attaching and detaching of the dust collector. Therefore, when the dust collector is not attached, the first inlet is closed, so that entry of dust into the tool body can be prevented. Further, in the power tool of the present aspect, the motor is housed in the tool body such that the motor shaft extends in parallel to the driving axis. Therefore, compared with a structure in which the motor shaft extends in a direction crossing the driving axis, the tool body can be formed compact.

It is noted that the power tool of the present aspect generally refers to any power tool configured to drive a tool accessory, which is attached to the power tool such that an axis of the tool accessory coincides with a prescribed driving axis. Such power tools may include, for example, a drilling tool (e.g. an electric drill, a vibration drill, and a hammer drill) configured to rotationally drive a tool accessory around a driving axis, and a hammering tool (e.g. a hammer drill and an electric hammer) configured to linearly drive a tool accessory along a driving axis.

The tool body may be referred to as a housing. For example, the tool body may be formed by connecting two halves which are divided along the driving axis, or may be formed by connecting a plurality of portions in the front-rear direction. Further, the tool body may be a housing having a single-layer structure, or may be a housing having a two-layered structure. The structure of the mounting part of the tool body is not particularly limited, as long as the mounting part is configured such that the dust collector can be attached and detached from the mounting part in parallel to the driving axis. Examples may include a structure with which the dust collector can be slidably engaged, in parallel to the driving axis, and a structure to which a portion of the dust collector can be fitted, in parallel to the driving axis.

The motor may be a direct current (DC) motor or a alternating-current (AC) motor. The motor may have a brush, or may be a brushless motor. Note that a brushless DC motor may be preferable since it is compact and exhibits high output power.

The structure or the opening and closing direction of the covering member is not particularly limited, as long as the covering member is capable of opening and closing the first inlet. Typically, the covering member may be held in the close position by a biasing force of an elastic member.

(Aspect 12)

The power tool as defined in Aspect 11, wherein:

the tool body extends in a front-rear direction along the driving axis, the power tool further includes a grip part protruding from a rear end portion of the tool body in a direction crossing the driving axis, the grip part being configured to be held by a user, the mounting part is disposed forward of the grip part and in an end portion of the tool body on a side to which the grip part protrudes, the mounting part extends in parallel to the driving axis, and the mounting part is configured to slidably engage with the dust collector.

In the power tool of the present aspect, the grip part protrudes from the rear end portion of the tool body which extends in the front-rear direction. Thus, the body and the grip part are arranged in an L-shape as a whole. Therefore, a dead space is formed in a region which is forward of the grip part and on the side of the tool body to which the grip protrudes. According to the present aspect, the mounting part for the dust collector is provided on the end portion of the tool body to which the grip protrudes. Thus, the power tool having the dust collector attached thereto can be made compact as a whole, while the dead space is effectively utilized as a space in which the dust collector is disposed. Further, the mounting part is configured as a so-called slide guide, with which the dust collector can be slidably engaged, so that attachment and detachment of the dust collector can be facilitated. As a slide guide, a guide groove which can be slidably engaged with a guide rail provided on the dust collector, or a guide rail which can be slidably engaged with a guide groove provided on the dust collector, for example, may be employed.

(Aspect 13)

The power tool as defined in Aspect 11 or 12, wherein:

the first inlet and the motor body are arranged on opposite sides of the fan in an extending direction of the motor shaft, and the tool body has an outlet formed radially outward of the fan.

According to the present aspect, the air flow which has passed through the suction passage of the dust collector and has been led in through the first inlet flows out of the tool body through the outlet, without flowing to the motor body. Therefore, the passage for the air flow within the tool body can be formed relatively short, so that excellent air blowing efficiency can be maintained. Further, even if the dust enters the tool body together with the air through the first inlet, the dust can be discharged through the outlet, before reaching the motor body.

(Aspect 14)

The power tool as defined in Aspect 13, wherein:

the tool body has a second inlet for introducing an air flow for cooling the motor, and the second inlet and the fan are arranged on opposite sides of the motor body in the extending direction of the motor shaft.

According to the present aspect, the motor can be cooled by the air flow (motor cooling air) led in through the second inlet which is provided on the side opposite to the fan across the motor body. Furthermore, the passage for the motor cooling air can also be formed relatively short, so that excellent air blowing efficiency can be maintained.

(Aspect 15)

The power tool as defined in Aspect 14, wherein:

the fan further has a second blade configured to generate the air flow for cooling the motor flowing into the tool body through the second inlet, and the first and second blades are integrally formed with each other to form the fan.

According to the present aspect, the single fan having the first and second blades can generate both the air flow for collecting the dust and the air flow for cooling the air. Therefore, compared with a structure in which a fan for collecting the dust and a fan for cooling the motor are separately provided, the structure can be simplified, so that space saving can be achieved.

(Aspect 16)

The power tool as defined in any one of Aspects 11 to 15, further comprising:

a driving mechanism configured to drive the tool accessory by power of the motor, wherein:

the tool body includes:

a driving mechanism housing part that houses the driving mechanism; and a motor housing part that houses the motor and that is connected to the driving mechanism housing part, and the covering member is held between the driving mechanism housing part and the motor housing part so as to be movable in parallel to the driving axis and is biased toward the close position by an elastic member.

According to the present aspect, the covering member which is capable of opening and closing the first inlet can be easily mounted to the body housing, simply by connecting the driving mechanism housing part and the motor housing part with the covering member disposed therebetween.
(Aspect 17)

The power tool as defined in any one of Aspects 11 to 16, wherein:

the covering member has a projection protruding in a direction crossing a direction of attaching and detaching the dust collector, and the covering member is moved to the open position in interlock with attaching of the dust collector to the mounting part, in a state in which the projection is held in contact with a portion of the dust collector.

According to the present aspect, the structure for moving the covering member to the open position in interlock with the attaching of the dust collector can be realized with such a simple structure as the projection.

DESCRIPTION OF THE NUMERALS

1: hammer drill, 10: body, 11: body housing, 111: first inlet, 112: second inlet, 113: second inlet, 114: outlet, 12: gear housing, 121: barrel, 125: support, 126: rear wall, 127: sealing member, 13: motor housing, 131: front end part, 132: intake chamber, 133: partition member, 134: rear wall, 135: peripheral wall, 136: cylindrical part, 138: central part, 141: elastic member, 143: slot, 144: guide pin, 15: handle housing, 16: covering part, 17: grip part, 171: trigger, 173: switch, 18: controller housing part, 181: controller, 183: battery mounting part, 2: motor, 20: motor body, 21: stator, 23: rotor, 25: motor shaft, 255: driving gear, 28: fan, 281: first blade, 282: second blade, 3: driving mechanism, 30: tool holder, 31: motion converting mechanism, 32: intermediate shaft, 321: driven gear, 33: rotary body, 34: swinging member, 35: piston cylinder, 36: cylinder, 37: striking mechanism, 371: striker, 373: impact bolt, 38: rotation transmitting mechanism, 381: first gear, 382: second gear, 41: mounting part, 42: guide groove, 43: engagement recess, 45: inlet, over, 451: cover body, 453: guide pin, 455: projection, 47: cover holding part, 471: opening, 473: guide part, 475: cover housing part, 476: upper wall, 477: lower wall, 478: recess, 48: elastic member, 5: dust collector, 51: body, 511: engagement part, 512: guide rail, 515: pressing projection, 52: internal space, 53: opening, 54: operation member, 541: elastic spring, 542: pressing part, 543: engagement projection, 6: dust storing part, 60: filter, 601: frame, 605: retaining member, 606: bottom wall, 607: side wall, 61: container body, 610: storing space, 611: engagement part, 612: engagement part, 64: filter holder, 641: cover part, 642: first opening, 643: second opening, 644: cylindrical wall, 646: outer peripheral wall part, 67: outer cover, 671: first opening, 672: second opening, 681: sealing member, 682: sealing member, 7: sliding part, 71: first cylindrical part, 711: suction hood, 712: suction port, 72: second cylindrical part, 74: hose, 76: hose connecting part, 78: connection tube, 781: central part, 783: connection end part, 785: elastic member, 80: dust transfer passage, 82: inflow passage, 83: communication passage, 87: tool connection passage, 870: outlet, 90: tool accessory, 93: battery, 95: auxiliary handle, A1: driving axis, A2: rotation axis

What is claimed is:

1. A power tool configured to perform a processing operation by driving a tool accessory attached to the power tool such that an axis of the tool accessory coincides with a driving axis, the power tool being connectable with a dust collector for collecting dust generated during the processing operation, the dust collector including a suction port that is configured to surround the tool accessory when the dust collector is connected to the power tool, an outlet and a suction passage extending from the suction port to the outlet, the power tool comprising:

a tool body including (1) a mounting part configured such that the dust collector is attachable to and detachable from the mounting part in parallel to the driving axis, (2) a first inlet configured to communicate the outlet of the dust collector when the dust collector is connected to the mounting part such that a first air flow flows from the outlet through the first inlet into the tool body, (3) a second inlet configured to introduce a second air flow for cooling the motor into the tool body, the second air flow being different from the first air flow, and (4) a common outlet for the first air flow and the second air flow, a motor including a motor body and a motor shaft, the motor body including a stator and a rotor, the motor shaft extending from the rotor in parallel to the driving axis;

a fan mounted on the motor shaft so as to rotate with the motor shaft, the fan having a first blade configured to generate the first air flow and a second blade configured to generate the second air flow; and a cover configured to be held in a close position where the cover closes the first inlet when the dust collector is not attached to the mounting part, and to be moved, in interlock with attaching of the dust collector to the mounting part, to an open position where the cover opens the first inlet wherein the common outlet is (1) radially outward of the fan and (2) between the first inlet and the motor body in a direction parallel to the driving axis, and the motor body is between the second inlet and the common outlet in the direction parallel to the driving axis.

2. The power tool as defined in claim 1, wherein:

the tool body extends in a front-rear direction along the driving axis, the power tool further includes a grip part protruding from a rear end portion of the tool body in a direction crossing the driving axis, the grip part being configured to be held by a user, the mounting part is forward of the grip part and in an end portion of the tool body on a side to which the grip part protrudes, the mounting part extends in parallel to the driving axis, and the mounting part is configured to slidably engage the dust collector.

3. The power tool as defined in claim 2, wherein:

the first and second blades are integral to form the fan.

4. The power tool as defined in claim 3, further comprising:

a driving mechanism configured to drive the tool accessory by power of the motor, wherein:

the tool body includes:

a driving mechanism housing part that houses the driving mechanism; and a motor housing part that houses the motor and that is connected to the driving mechanism housing part, and the cover is held between the driving mechanism housing part and the motor housing part so as to be movable in parallel to the driving axis and is biased toward the close position by an elastic member.

5. The power tool as defined in claim 4, wherein:
the cover has a projection protruding in a direction that intersects a direction of attaching and detaching the dust collector, and
the cover is moved to the open position in interlock with attaching of the dust collector to the mounting part, in a state in which the projection is held in contact with a portion of the dust collector.

6. The power tool as defined in claim 1, wherein:
the first and second blades are integral to form the fan.

7. The power tool as defined in claim 1, further comprising:
a driving mechanism configured to drive the tool accessory by power of the motor, wherein:
the tool body includes:
a driving mechanism housing part that houses the driving mechanism; and
a motor housing part that houses the motor and that is connected to the driving mechanism housing part, and
the cover is held between the driving mechanism housing part and the motor housing part so as to be movable in parallel to the driving axis and is biased toward the close position by an elastic member.

8. The power tool as defined in claim 7, wherein:
the fan is in the motor housing part,
an intake chamber defined by a partition member is between the fan and the driving mechanism housing part, and
the partition member has the first inlet and a through hole facing the fan.

9. The power tool as defined in claim 8, wherein a sealing member is between the partition member and a support that supports the driving mechanism within the driving mechanism housing part.

10. The power tool as defined in claim 1, wherein:
the cover has a projection protruding in a direction that intersects a direction of attaching and detaching the dust collector, and
the cover is moved to the open position in interlock with attaching of the dust collector to the mounting part, in a state in which the projection is held in contact with a portion of the dust collector.

11. A power tool configured to perform a processing operation by driving a tool accessory attached to the power tool such that an axis of the tool accessory coincides with a driving axis, the power tool being connectable with a dust collector for collecting dust generated during the processing operation, the dust collector including a suction port that is configured to surround the tool accessory when the dust collector is connected to the power tool, an outlet and a suction passage extending from the suction port to the outlet, the power tool comprising:
a tool body extending along the driving axis and including a mounting part and a first inlet, the mounting part being configured to removably receive the dust collector, the first inlet being configured to communicate with the outlet when the dust collector is attached to the mounting part;
a motor including a motor body and a motor shaft, the motor body including a stator and a rotor, the motor shaft extending from the rotor in parallel to the driving axis;
a driving mechanism configured to drive the tool accessory by power of the motor;
a fan (1) mounted on the motor shaft so as to rotate with the motor shaft and (2) having a first blade configured to generate a dust-collecting air flow flowing through first inlet and into the tool body when the dust collector is attached to the mounting part;
a cover that is movable in a direction parallel to the driving axis between a close position where the cover closes the first inlet and an open position where the cover opens the first inlet; and
an elastic member,
wherein:
the mounting part is configured such that the dust collector is attached to and detached from the mounting part while being moved in the direction parallel to the driving axis,
the tool body includes a motor housing part that houses the motor, and
the elastic member is between the cover and the motor housing part in the direction parallel to the driving axis and configured to bias the cover member in the direction parallel to the driving axis toward the close position, and
the cover is configured to be held in the close position by a biasing force of the elastic member when the dust collector is not attached to the mounting part, and to be moved, in interlock with attaching of the dust collector to the mounting part, to the open position.

12. A power tool configured to perform a processing operation by driving a tool accessory attached to the power tool such that an axis of the tool accessory coincides with a driving axis, the power tool being connectable with a dust collector for collecting dust generated during the processing operation, the dust collector including a suction port that is configured to surround the tool accessory when the dust collector is connected to the power tool, an outlet and a suction passage extending from the suction port to the outlet, the power tool comprising:
a tool body including a mounting part and a first inlet, the mounting part being configured such that the dust collector is attachable to and detachable from the mounting part in parallel to the driving axis, the first inlet being configured to communicate with the suction passage via the outlet when the dust collector is connected to the mounting part;
a motor including a motor body and a motor shaft, the motor body including a stator and a rotor, the motor shaft extending from the rotor in parallel to the driving axis;
a driving mechanism configured to drive the tool accessory by power of the motor;
a fan mounted on the motor shaft so as to rotate with the motor shaft, the fan having a first blade configured to generate a dust-collecting air flow flowing through the suction passage and into the tool body through the first inlet when the dust collector is connected to the mounting part; and
a cover configured to be held in a close position where the cover closes the first inlet when the dust collector is not attached to the mounting part, and to be moved, in interlock with attaching of the dust collector to the mounting part, to an open position where the cover opens the first inlet,
wherein:
the tool body includes:
a driving mechanism housing part that houses the driving mechanism; and
a motor housing part that houses the motor and that is connected to the driving mechanism housing part, the cover is held between the driving mechanism housing part and the motor housing part so as to be movable in parallel to the driving axis and is biased toward the close position by an elastic member,
the fan is in the motor housing part,
an intake chamber defined by a partition member is between the fan and the driving mechanism housing part,
the partition member has the first inlet and a through hole facing the fan, and
a sealing member is between the partition member and a support that supports the driving mechanism within the driving mechanism housing part.

* * * * *